United States Patent
Beg et al.

(10) Patent No.: US 11,617,100 B2
(45) Date of Patent: Mar. 28, 2023

(54) SYSTEMS AND METHODS FOR WI-FI SENSING

(71) Applicant: Cognitive Systems Corp., Waterloo (CA)

(72) Inventors: Chris Beg, Waterloo (CA); Mohammad Omer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 17/671,177

(22) Filed: Feb. 14, 2022

(65) Prior Publication Data

US 2022/0272561 A1    Aug. 25, 2022

Related U.S. Application Data

(60) Provisional application No. 63/149,473, filed on Feb. 15, 2021.

(51) Int. Cl.
*H04W 24/10* (2009.01)
*H04W 8/24* (2009.01)
*H04W 84/12* (2009.01)

(52) U.S. Cl.
CPC ............ *H04W 24/10* (2013.01); *H04W 8/24* (2013.01); *H04W 84/12* (2013.01)

(58) Field of Classification Search
CPC ........ H04W 24/10; H04W 8/24; H04W 84/12
See application file for complete search history.

(56) References Cited

U.S. PATENT DOCUMENTS

| | | | |
|---|---|---|---|
| 2015/0195286 A1* | 7/2015 | Doppler | H04L 67/125 726/4 |
| 2019/0146076 A1 | 5/2019 | Kravets et al. | |
| 2020/0359248 A1* | 11/2020 | Sadeghi | H04W 24/10 |
| 2021/0273735 A1 | 9/2021 | Da Silva et al. | |
| 2021/0288779 A1 | 9/2021 | Da Silva et al. | |
| 2022/0070710 A1* | 3/2022 | Lim | H04W 24/10 |
| 2022/0070927 A1 | 3/2022 | Lim et al. | |

FOREIGN PATENT DOCUMENTS

WO    2022148461 A1    7/2022

OTHER PUBLICATIONS

Ma, Y., "Improving Wifi Sensing and Networking With Channel State Information". Dissertations, Theses, and Masters Projects. William & Mary, 2019, vol. Paper 1593091976, pp. 1-198, [online] [retrieved on Mar. 15, 2022 (Mar. 15, 2022)]. Retrieved from the Internet: <http://dx.doi.org/I 0.21220/s2-dwgg-3j27>.

Restuccia, F., "IEEE 802.11bf: Toward Ubiquitous Wi-Fi Sensing". Department of Electrical and Computer Engineering, Northeastern University, Mar. 27, 2021, pp. 1-7, Retrieved from the Internet: https://arxiv.org/pdf/2103.14918.

* cited by examiner

*Primary Examiner* — Chuong A Ngo
(74) *Attorney, Agent, or Firm* — Medler Ferro Woodhouse & Mills PLLC

(57) ABSTRACT

Systems and methods for Wi-Fi sensing are provided. Wi-Fi sensing systems include sensing devices and remote devices configured to communicate through radio-frequency signals. Sensing devices and remote devices are configured to communicate with one another to establish sensing transmission configurations through established protocols. Sensing devices described herein are configured to provide Wi-Fi sensing measurements based on the reception of messages transmitted from remote devices according to established configurations.

34 Claims, 29 Drawing Sheets

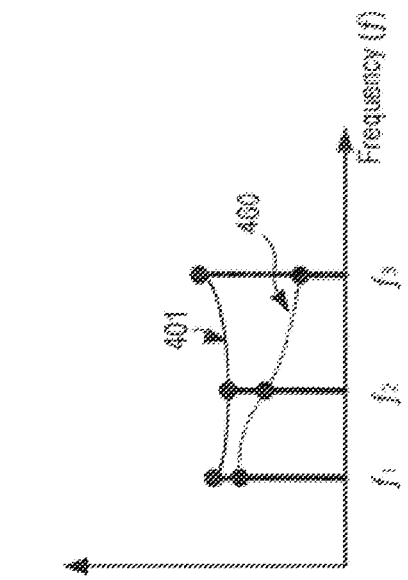
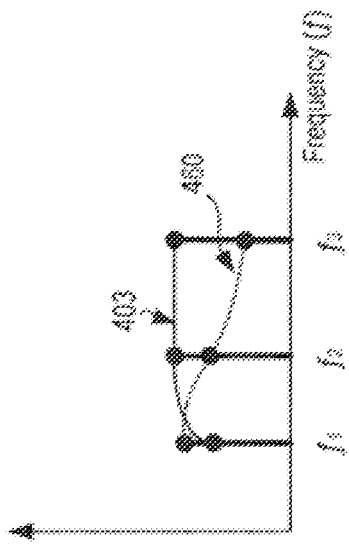
FIG. 4C
FIG. 4D

| Reserved | Number of Burst -- Exponent | Burst Duration | Time Between Frames | Partial TSF timer |
|---|---|---|---|---|
| 8 | 4 | 4 | 8 | 16 |

Bits:

| Reserved | Measurements Per Burst | Reserved | Burst Period |
|---|---|---|---|
| 3 | 5 | 8 | 16 |

Bits:

FIG. 10B

SYSTEMS AND METHODS FOR WI-FI SENSING

TECHNICAL FIELD

The present disclosure generally relates to systems and methods for Wi-Fi sensing. In particular, the present invention relates to configuring Wi-Fi systems to perform Wi-Fi sensing whist minimizing overheads and impact to Wi-Fi system performance.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems. A Wi-Fi sensing system is one recent addition to motion detection systems. Aspects of embodiments presented herein provide improvements to Wi-Fi sensing systems.

BRIEF SUMMARY OF THE DISCLOSURE

The present disclosure generally relates to systems and methods for Wi-Fi sensing. In particular, the present invention relates to configuring Wi-Fi systems to perform Wi-Fi sensing whilst minimizing overheads and impact to Wi-Fi system performance.

Systems and methods are provided for Wi-Fi sensing. In an example embodiment, a system configured for Wi-Fi sensing is described. The system may include a sensing device. Further, the sensing device may include a transmitting antenna, a receiving antenna, and a processor. The processor may be configured to cause the transmitting antenna to transmit a sensing configuration message. Further, the processor may receive, via the receiving antenna, a sensing configuration response message.

In some implementations, the sensing configuration message may include a configuration query indication and the sensing configuration response message may include a transmission capability indication associated with a remote device.

In some implementations, the sensing configuration message may not include any data elements.

In some implementations, the sensing configuration message may include data elements.

In some implementations, the sensing configuration message may include a requested transmission configuration corresponding to requirements of a sensing transmission and the sensing configuration response message may include a delivered transmission configuration corresponding to a transmission capability associated with a remote device.

In an example embodiment, a system configured for Wi-Fi sensing is described. The system may include a remote device. Further, the remote device may include a transmitting antenna, a receiving antenna, and a processor. The processor may be configured receive a sensing configuration message including a requested transmission configuration, determine that a transmission capability associated with the remote device corresponds to the requested transmission configuration, and send a sensing configuration response message including a delivered transmission configuration. In some embodiments, the delivered transmission configuration matches the requested transmission configuration. In some embodiments, the delivered transmission configuration does not match the requested transmission configuration In some embodiments an antenna may be used to both transmit and receive a signal in a half-duplex format. When the antenna is transmitting, it may be referred to as the transmitting antenna and when the antenna receiving, it may be referred to as the receiving antenna.

In some implementations, the remote device may further be configured to transmit one or more sensing transmissions according to the requested transmission configuration when no requested transmission configuration is included in a sensing trigger.

In some implementations, the transmitted sensing configuration message may include one or more predefined steering matrix configurations identifiable by an index and the received sensing configuration response message may include a steering matrix configuration acknowledgement associated with a remote device.

In some implementations, the sensing configuration request is carried in a first action management frame sent to the remote device by a sensing device, and the sensing configuration response is carried in a second action management frame sent to the sensing device.

In yet another example embodiment, a system configured for Wi-Fi sensing is described. The system may include a sensing device including a transmitting antenna, a receiving antenna, and a processor. The processor may be configured to cause the transmitting antenna to transmit a sensing trigger message and receive, via the receiving antenna, a sensing transmission transmitted in response to the sensing trigger message. In some embodiments an antenna may be used to both transmit and receive a signal in a half-duplex format. When the antenna is transmitting, it may be referred to as the transmitting antenna and when the antenna receiving, it may be referred to as the receiving antenna.

In some implementations, the sensing trigger message may include a requested transmission configuration not exceeding a remote device transmission capability.

In some implementations, the sensing trigger message may include a requested timing configuration for the sensing transmission and where the received sensing transmission is transmitted in response to the sensing trigger message and according to the requested timing configuration.

In some implementations, the requested timing configuration may be indicative of timing requirements for a measurement campaign including a series of sensing transmissions from a remote device to a sensing device.

In some implementations, the processor may further be configured to receive a sensing transmission from a remote device in response to the sensing trigger message and perform a sensing measurement on the received sensing transmission.

In yet another example embodiment, a system for Wi-fi sensing is described. The system may include a remote device. Further, the remote device may include at a transmitting antenna, a receiving antenna, and a processor. The processor may be configured to cause the receiving antenna to receive a sensing trigger message and transmit, via the transmitting antenna, a sensing response message in response to receiving the sensing trigger message.

In yet another example embodiment, a system for Wi-Fi sensing is described. The system may include a remote device. Further, the remote device may include a transmitting antenna, a receiving antenna, and a processor. The processor may be configured to cause the receiving antenna to receive a sensing trigger message, transmit, via the transmitting antenna, a sensing response announcement in response to receiving the sensing trigger message, and transmit, via the transmitting antenna, a sensing response NDP.

In some implementations, the sensing trigger message may further include a requested transmission configuration.

In some implementations, a delivered transmission configuration may be included in the sensing response message in response to receiving the sensing trigger message including the requested transmission configuration.

In some implementations, prior to the delivery of the sensing response message, remote device transmission parameters corresponding to the delivered transmission configuration may be applied to the remote device.

In some implementations, a delivered transmission configuration may be included in the sensing response announcement in response to receiving the sensing trigger message including the requested transmission configuration.

In some implementations, remote device transmission parameters corresponding to the delivered transmission configuration may be applied to the remote device prior to the transmission of the sensing response NDP.

In some implementations, the sensing measurement may be performed on a training field of the received sensing transmission.

In some implementations, the received sensing transmission may include one of a sensing response NDP or a sensing response message.

In some implementations, the received sensing transmission may include a delivered transmission configuration.

In some implementations, prior to the sensing device receiving the sensing transmission, the sensing device may receive a sensing response announcement.

In some implementations, the sensing response announcement may include a delivered transmission configuration.

In some implementations, the remote device may further be configured to generate a sensing response message when the requested transmission configuration supports data transfer and generate a sensing response announcement when the requested transmission configuration does not support data transfer.

In some implementations, the remote device may further be configured to transmit a series of sensing transmissions according to requested timing configuration.

In some implementations, the series of sensing transmissions configured according to requested timing configuration may be periodic.

In some implementations, the remote device may further be configured to halt the series of sensing transmissions when the requested timing configuration is fulfilled or a new sensing trigger message is received.

In some implementations, the sensing trigger message may include a steering matrix configuration within the requested transmission configuration.

In some implementations, the sensing trigger message may include an index to one or more preconfigured steering matrix configurations within the requested transmission configuration.

In some implementations, the requested transmission configuration may indicate a default preconfigured steering matrix configuration.

In some implementations, the processor may further be configured to determine whether a queued non-sensing message is present at the sensing device, incorporate the sensing trigger message into the queued non-sensing message in response to determining that a queued non-sensing response message is present, and prepare the sensing trigger message as a dedicated sensing trigger message in response to determining that no queued non-sensing response message is present.

In some implementations, the sensing trigger message may be incorporated with the queued non-sensing message using Aggregated MPDU.

In some implementations, the sensing trigger message may be incorporated with the queued non-sensing message using Multi Traffic ID Aggregated MPDU.

In some implementations, the sensing trigger message may be included as a first frame in the incorporated message.

In some implementations, the sensing trigger message may further include a requested timing configuration.

In some implementations, the remote device may further be configured to determine whether a queued non-sensing message is present in response to receiving the sensing trigger message, incorporate the sensing response message into the queued non-sensing message in response to determining that a queued non-sensing response message is present, and prepare the sensing response message as a dedicated transmission in response to determining that a queued non-sensing response message is not present.

In some implementations, the remote device may further be configured to determine whether a queued non-sensing message is present in response to receiving the sensing trigger message, incorporate the sensing response announcement into the queued non-sensing message in response to determining that a queued non-sensing response message is present, and prepare the sensing response announcement as a dedicated transmission in response to determining that a queued non-sensing response message is not present.

In some implementations, the sensing response message or the sensing response announcement may be incorporated with the queued non-sensing message using Aggregated MPDU.

In some implementations, the sensing response message or the sensing response announcement may be incorporated with the queued non-sensing message using Multi Traffic ID Aggregated MPDU.

In some implementations, the sensing response announcement may be included as a first frame in the incorporated message.

In some implementations, the sensing transmission may be transmitted according to a received timing configuration.

In some implementations, the steering matrix configuration may describe a plurality of beamforming weights to be applied to sensing transmissions by a spatial mapper of a remote device.

In some implementations, the one or more steering matrix configurations each may describe a plurality of beamforming weights to be applied to sensing transmissions by a spatial mapper of a remote device.

In some implementations, the sensing trigger message may include a selection of the one or more preconfigured steering matrix configurations as the requested transmission configuration.

In some implementations, the sensing trigger message may further include a requested timing configuration.

In some implementations, the remote device may further be configured to determine whether a queued non-sensing message present at the remote device is compliant with the requested timing configuration, incorporate the sensing response message into the queued non-sensing message in response to determining that the queued non-sensing message is compliant with the requested timing configuration, and send the incorporated message.

In some implementations, the remote device may further be configured to determine whether a queued non-sensing message present at the remote device is compliant with the requested timing configuration, incorporate the sensing response message into the queued non-sensing message in response to determining that a queued non-sensing message is not is compliant with the requested timing configuration, adjust the timing of the incorporated message to be compliant with the requested timing configuration, and send the incorporated message.

In some implementations, the remote device may further be configured to determine whether a queued non-sensing message present at the remote device is compliant with the requested transmission configuration, incorporate the sensing response announcement into the queued non-sensing message in response to determining that a queued non-sensing message is not compliant with the requested transmission configuration, and send the incorporated message.

In some implementations, the processor may further be configured to identify a delivered transmission configuration of the sensing transmission and compute a sensing measurement according to the delivered transmission configuration and the sensing transmission.

In some implementations, the processor may further be configured to identify a delivered transmission configuration included in the sensing transmission as the transmission configuration.

In some implementations, the processor may further be configured to determine that the sensing transmission does not include a delivered transmission configuration and to identify a default transmission configuration as the transmission configuration responsive to the determination.

In some implementations, the processor may further be configured receive a sensing response NDP following the sensing response announcement.

In further implementations, a method for Wi-Fi sensing is provided. The method includes transmitting, via at least one transmitting antenna of a sensing device, a sensing configuration message; and receiving, via at least one receiving antenna of the sensing device, a sensing configuration response message.

In further implementations, a method configured for Wi-Fi sensing is provided. The method includes receiving, via a receiving antenna of a remote device, a sensing configuration message including a requested transmission configuration; determining, by at least one processor of the remote device, that a transmission capability associated with the remote device corresponds to the requested transmission configuration; and sending, via a transmitting antenna of the remote device, a sensing configuration response message including a delivered transmission configuration. In some embodiments, the delivered transmission configuration matches the requested transmission configuration. In some embodiments, the delivered transmission configuration does not match the requested transmission configuration.

In further implementations, a method for Wi-Fi sensing is provided. The method includes, transmitting, by at least one transmitting antenna of a sensing device, a sensing trigger message; receiving, via at least one receiving antenna of the sensing device, a sensing response announcement transmitted in response to the sensing trigger message, wherein the sensing response announcement includes a delivered transmission configuration; and receiving, via the at least one receiving antenna, a sensing response NDP following the sensing response announcement.

In further implementations, a method for Wi-Fi sensing is provided. The method includes, receiving, by at least one receiving antenna of a remote device, a sensing trigger message; and transmitting, via at least one transmitting antenna of the remote device and responsive to receiving the sensing trigger message, a sensing response message.

In further implementations, a method for Wi-Fi sensing is provided. The method includes, receiving, by at least one receiving antenna of a remote device, a sensing trigger message; transmitting, by at least one transmitting antenna of the remote device and responsive to receiving the sensing trigger message, a sensing response announcement; and transmitting, via the at least one transmitting antenna, a sensing response NDP.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4C and FIG. 4D are plots showing the example channel responses of FIG. 4A and FIG. 4B overlaid on an example channel response associated with no motion occurring in the space.

FIG. 10A and FIG. 10B illustrates a periodic measurement configuration field, according to some embodiments;

DETAILED DESCRIPTION

Figure 1:
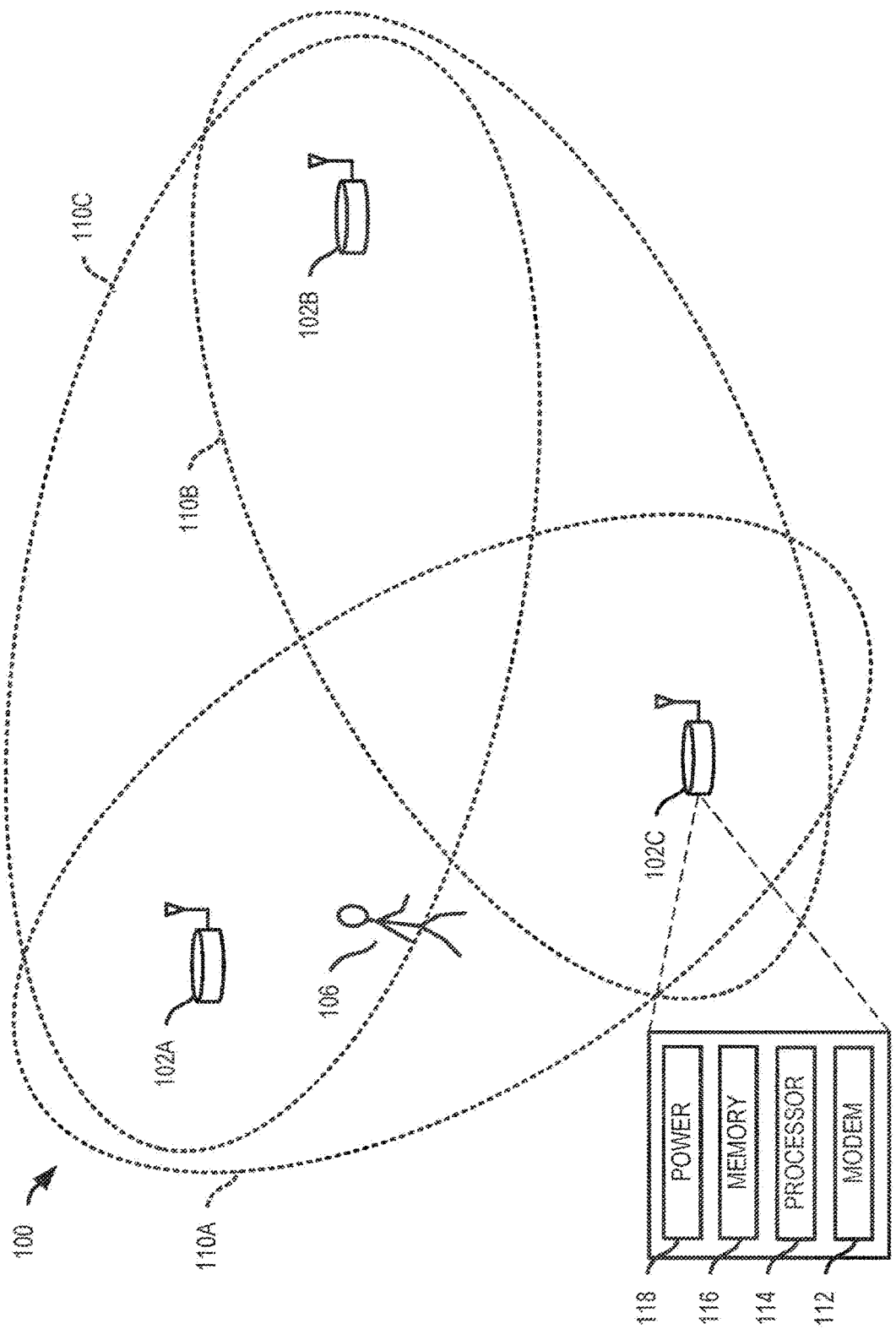
FIG. 1 is a diagram showing an example wireless communication system.

The Wi-Fi sensing system may measure an environment by transmitting signal(s) to remote device(s) and analyzing response(s) received from the remote device(s). The Wi-Fi sensing system may perform repeated measurements to analyze the environment and the changes thereof. The Wi-Fi sensing system may operate in conjunction with existing communication components, and benefits from having a Medium Access Control (MAC) layer entity, which may be used for the coordination of air-time resource usage among multiple devices based upon defined protocol.

One of the relevant standardization goals of the Wi-Fi sensing systems is to reduce additional overheads on existing Wi-Fi networks, such that overlaying Wi-Fi sensing capability on the 802.11 network does not compromise the communication function of the network. Currently there are no known MAC protocols specifically defined for sensing in the Wi-Fi sensing systems. One aspect of sensing in the Wi-Fi sensing systems is a solicitation of a sensing transmission from a remote device. Improvements to MAC layer to enable solicitation of a sensing transmission from the remote device with characteristics that are optimized to allow the Wi-Fi sensing agent to detect presence, location and motion may significantly impact existing system performance. In particular, the request or solicitation of the remote device transmission optimized for sensing (or a sensing transmission) may impact an uplink scheduler of the remote device. There are existing mechanisms to request or solicit the remote device to transmit the sensing transmission. However, such mechanisms were designed for different purposes. As a result, these mechanisms are not efficient, offer no flexibility in control, and are not universally consistent among different vendor implementations. Furthermore, a channel sounding protocol may be considered for supporting Wi-Fi sensing. However, the channel sounding protocol is not currently flexible and thus, such functionality in support of Wi-Fi sensing is not possible.

Protocols for Wi-Fi systems are designed with decisions made on a basis of the data transfer mechanism as against sensing requirements. As a result, Wi-Fi sensing aspects are frequently not developed within common Wi-Fi systems. With respect to antenna beamforming in the Wi-Fi systems, digital signal processing directs a beam of high antenna gain in the direction of a transmitter or receiver for optimal data transfer purposes and as a result, the antenna pattern may not support or enhance sensing requirements.

In some aspects of what is described herein, a wireless sensing system may be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access-point (AP) assumes the receiver role, and each Wi-Fi device (station or node or peer) connected to the AP assume the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at some angles experience constructive interference while others experience destructive interference.

The channel information for each of the communication links may be analyzed (e.g., by a hub device or other device in a wireless communication network, or a remote device communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless APs each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP, but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

As disclosed in embodiments herein, a wireless local area network (WLAN) sensing procedure allows a station (STA) to perform WLAN sensing. WLAN sensing may include a WLAN sensing session. In examples, WLAN sensing procedure, WLAN sensing, and WLAN sensing session may be referred to as wireless sensing procedure, wireless sensing, and wireless sensing session, Wi-Fi sensing procedure, Wi-Fi sensing, and Wi-Fi sensing session, or sensing procedure, sensing, and sensing session.

WLAN sensing is a service that enables a STA to obtain sensing measurements of the channel(s) between two or more STAs and/or the channel between a receive antenna and a transmit antenna of a STA or an access point (AP). A WLAN sensing procedure may be composed of one or more of the following: sensing session setup, sensing measurement setup, sensing measurement instances, sensing measurement setup termination, and sensing session termination.

In examples disclosed herein, sensing session setup and sensing measurement setup may be referred to as sensing configuration and may be achieved by a sensing configuration message and may be confirmed by a sensing configuration response message. A sensing measurement instance may be an individual sensing measurement and may be derived from a sensing transmission. In examples, the sensing configuration message may be referred to as a sensing measurement setup request, and the sensing configuration response message may be referred to as a sensing measurement setup response.

A WLAN sensing procedure may include multiple sensing measurement instances. In examples, the multiple sensing measurement instances may be referred to a measurement campaign.

A sensing initiator may refer to a STA or an AP that initiates a WLAN sensing procedure. A sensing responder may refer to a STA or an AP that participates in a WLAN sensing procedure initiated by a sensing initiator. A sensing transmitter may refer to a STA or an AP that transmits physical-layer protocol data units (PPDU) used for sensing measurements in a WLAN sensing procedure. A sensing receiver may refer to a STA or an AP that receives PPDUs sent by a sensing transmitter and performs sensing measurements in a WLAN sensing procedure.

In examples, PPDU(s) used for a sensing measurement may be referred to as a sensing transmission.

A STA acting as a sensing initiator may participate in a sensing measurement instance as a sensing transmitter, a sensing receiver, both a sensing transmitter and sensing receiver, or neither a sensing transmitter nor a sensing receiver. A STA acting as a sensing responder may participate in a sensing measurement instance as a sensing transmitter, a sensing receiver, and both a sensing transmitter and a sensing receiver.

In an example, a sensing initiator may be considered to control the WLAN sensing procedure or the measurement campaign.

In examples, a sensing transmitter may be referred to as a remote device and a sensing receiver may be referred to as a sensing device. In other examples, a sensing initiator may be a function of a sensing device or of a remote device, and a sensing responder may be a function of a sensing device or of a remote device.

IEEE P802.11-REVmd/D5.0 considers a STA to be a physical (PHY) and media access controller (MAC) entity capable of supporting features defined by the specification. A device containing a STA may be referred to as a Wi-Fi device. A Wi-Fi device which manages a basic service set (BSS) (as defined by IEEE P802.11-REVmd/D5.0) may be referred to as an AP STA. A Wi-Fi device which is a client node in a BSS may be referred to as a non-AP STA. In some examples, an AP STA may be referred to as an AP and a non-AP STA may be referred to as a STA.

In various embodiments of the disclosure, non-limiting definitions of one or more terms that will be used in the document are provided below.

A term "measurement campaign" may refer to a bi-directional series of sensing transmissions between a sensing device (commonly known as wireless access-point, Wi-Fi access point, access point, sensing initiator, or sensing receiver) and a remote device (commonly known as Wi-Fi device, sensing responder, or sensing transmitter) that allows a series of sensing measurements to be computed.

A term "message" may refer to any set of data which is transferred from the sensing device to the remote device (or vice versa) during the measurement campaign. The message may be carried in a frame and that frame can be a Medium Access Control (MAC)-layer Protocol Data Unit (MPDU) or an Aggregated MPDU (A-MPDU). The frame in the form of an MPDU or A-MPDU may be transferred from the sensing device to the remote device (or vice versa) as a sensing transmission. In an example, the transmission may be carried out by PHY layer and may be in the form of a PHY-layer Protocol Data Unit (PPDU).

A term "Null Data PPDU (NDP)" may refer to a PPDU that may not include any data field. In an example, the NDP may be used for a sensing transmission where it is a MAC header that includes required information.

A term "sensing transmission" may refer to any transmission made from the remote device to the sensing device which may be used to make a sensing measurement. In an example, sensing transmission may also be referred to as wireless sensing signal or wireless signal. In an example, the sensing transmission may be either a sensing response message or a sensing response NDP including one or more training fields used to make a sensing measurement.

A term "sensing measurement" may refer to a measurement of a state of a channel i.e., CSI measurement between the remote device and the sensing device derived from a sensing transmission. In an example, sensing measurement may also be referred to as channel response measurement.

A term "transmission capability" may refer to one or more parameters which indicate transmission capabilities of the remote device. For example, the transmission capability for the remote device may indicate a number of transmitting antennas in the remote device.

A term "transmission parameters" may refer to a set of IEEE 802.11 PHY transmitter configuration parameters which are defined as part of transmission vector (TXVECTOR) corresponding to a specific PHY and which are configurable for each PPDU transmission.

A term "sensing configuration message" may refer to a configuration message that may be used to pre-configure sensing transmissions from the remote device to the sensing device, for example, for a measurement campaign.

A term "requested transmission configuration" may refer to requested transmission parameters of the remote device to be used when sending a sensing transmission. In an example, the requested transmission configuration may include one or more configuration elements, such as IEEE 802.11 Elements (IEEE P802.11-REVmd/D5.0, § 9.4.2).

A term "sensing configuration response message" may refer to a response message to a sensing configuration message that indicates which configuration options are supported by the remote device, for example, transmission capability of the remote device. In an example, the sensing configuration response message may be sent from the remote device to the sensing device in response to the sensing configuration message.

A term "delivered transmission configuration" may refer to transmission parameters applied by the remote device to a sensing transmission. In an example, delivered transmission configuration may include transmission parameters that are supported by the remote device.

A term "steering matrix configuration" may refer to a matrix of complex values representing real and complex phase required to pre-condition antenna of a Radio Frequency (RF) transmission signal chain for each transmit signal. Application of the steering matrix configuration (for example, by a spatial mapper) enables beamforming and beam-steering.

A term "spatial mapper" may refer to a signal processing element that adjusts an amplitude and a phase of a signal input to an RF transmission signal chain in the remote device. The spatial mapper may include elements to process the signal to each RF transmission signal chain. The operation carried out to adjust the amplitude and the phase of the signal may be referred to as spatial mapping. The output of the spatial mapper is one or more spatial streams.

A term "sensing trigger message" may refer to a message sent from the sensing device to the remote device to trigger one or more sensing transmissions that may be used for performing sensing measurements. In an example, the sensing trigger message may include requested transmission configuration, requested timing configuration, and/or steering matrix configuration.

A term "requested timing configuration" may refer to a set of timing requirements for sensing transmissions, for example, for a measurement campaign. In an example, timing requirements may be periodic, semi-periodic, and once.

A term "sensing response message" may refer to a message which is included within a sensing transmission from the remote device to the sensing device. In an example, the sensing transmission that includes the sensing response message may be used to perform a sensing measurement.

A term "sensing response announcement" may refer to a message which is included within a transmission from the remote device to the sensing device that announces that a sensing response NDP will follow after one Short Interframe Spacing (SIFS). The duration of SIFS may be, for example, 10 µs. In an example, the sensing response NDP may be transmitted using the requested transmission configuration.

A term "sensing response NDP" may refer to an NDP response transmitted by the remote device and used for sensing measurement at the sensing device. In an example, the sensing response NDP may be used when a requested transmission configuration is incompatible with transmission parameters required for successful non-sensing message reception. Further, in an example, the sensing response NDP may be announced by the sensing response announcement.

A term "non-sensing message" may refer to any message which is not related to Wi-Fi sensing. In an example, the non-sensing message may include data messages, management messages, and control messages.

A term "training field" may refer to a sequence of bits transmitted by the sensing device which is known by the remote device and used on reception to measure channel for purposes other than demodulation of data portion of a containing PPDU. In an example, the training field is included within a preamble of a transmitted PPDU. In some examples, a future training field may be defined within a preamble structure (cascading training fields with legacy support) or it may replace existing training fields (non-legacy support).

A term "transmission opportunity (TXOP) may refer to a negotiated interval of time during which a particular quality of service (QoS) station (e.g., a sensing device or a remote device may have the right to initiate a frame exchange onto a wireless medium. A QoS access category (AC) of the transmission opportunity may be requested as part of a negotiation.

A term "Quality of Service (QoS) access category" may refer to an identifier for a frame which classifies a priority of transmission that the frame requires. In an example, four QoS access categories are defined namely AC_VI: Video, AC_VO: Voice, AC_BE: Best-Effort, and AC_BK: Background. Further, each QoS access category may have differing transmission opportunity parameters defined for it.

A term "Timing Synchronization Function (TSF)" may refer to a common timing reference within a set of associated stations, BSS. In an example, the TSF may be kept synchronized by a beacon message transmitted from a shared access point of the BSS. In an example, the timing resolution of TSF may be 1 millisecond.

A term "first frame" may refer to a foremost frame of an aggregated data frame. In an example, the first frame may include a sensing trigger message, a sensing response message or a sensing response announcement.

A term "dedicated message" may refer to a standalone message that is not aggregated with any other message.

A term "broadcast message" may refer to a message that is sent by a sensing device to remote devices that are associated with the sensing device. In an example, the broadcast message may be received and decoded by the remote devices.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes embodiments of systems and methods for Wi-Fi sensing. In particular, section B describes Wi-Fi systems to perform Wi-Fi sensing without adding overheads or impacting Wi-Fi system performance.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®, Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include, standard wireless network components. For example, wireless communication devices 102A, 102B, 102C may be commercially-available Wi-Fi APs or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to RF signals, and wirelessly transmits the RF signals (e.g., through an antenna). In some instances, the radio subsystem in modem 112 wirelessly receives RF signals (e.g., through an antenna), down- converts the RF signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIG. 11 to FIG. 13.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an alternating current (AC) adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIG. 11 to FIG. 27, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
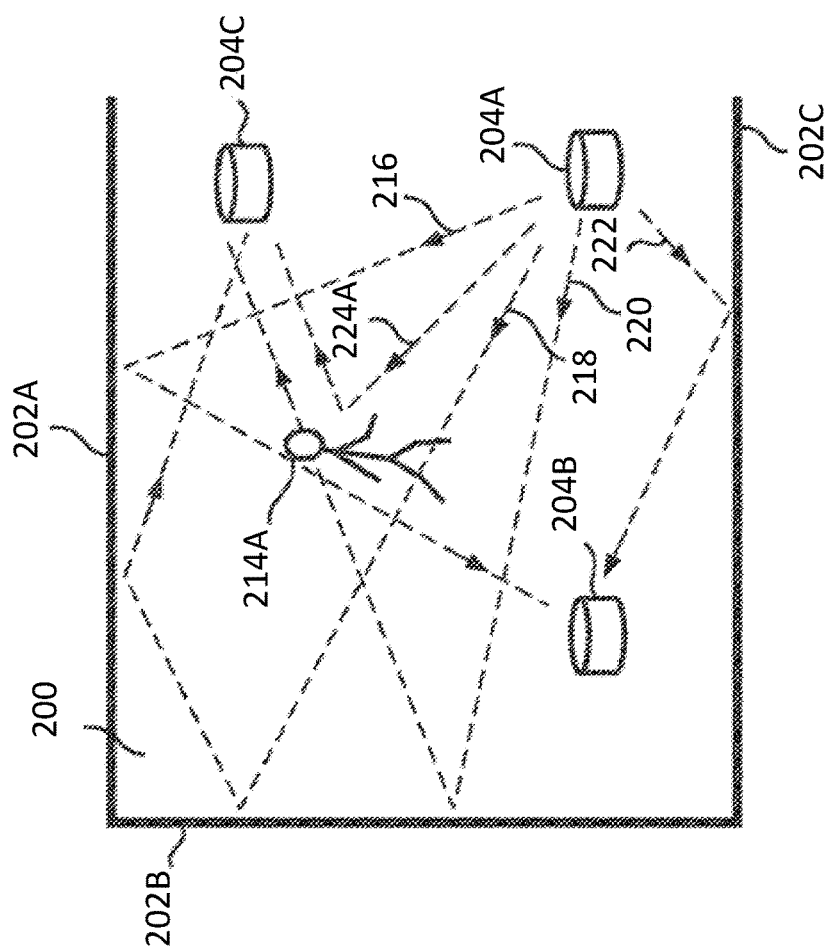
FIG. 2A and FIG. 2B are diagrams showing example wireless signals communicated between wireless communication devices.
Figure 2B:
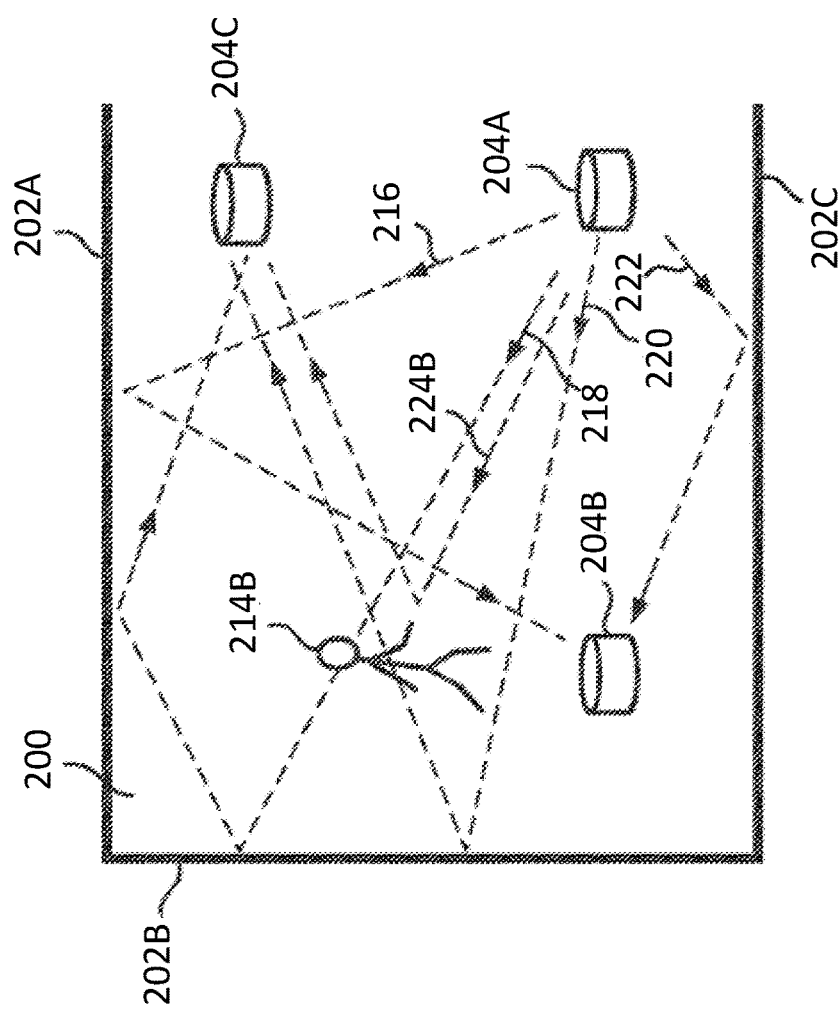

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path, k, may be described according to Equation (2):

$$r_k(t) = \sum_{n=-\infty}^{\infty} \alpha_{n,k} c_n e^{j(\omega_n t + \phi_{n,k})} \tag{2}$$

Where $\alpha_{n,k}$ represents an attenuation factor (or channel response; e.g., due to scattering, reflection, and path losses) for the nth frequency component along k, and $\phi_{n,k}$ represents the phase of the signal for nth frequency component along k. Then, the received signal, R, at a wireless communication device can be described as the summation of all output signals $r_k(t)$ from all paths to the wireless communication device, which is shown in Equation (3):

$$R=\Sigma_k r_k(t) \quad (3)$$

Substituting Equation (2) into Equation (3) renders the following Equation (4):

$$R=\Sigma_k \Sigma_{n=-\infty}^{\infty} (\alpha_{n,k} e^{j\phi_{n,k}}) c_n e^{j\omega_n t} \quad (4)$$

R at a wireless communication device can then be analyzed. R at a wireless communication device can be transformed to the frequency domain, for example, using a Fast Fourier Transform (FFT) or another type of algorithm. The transformed signal can represent R as a series of n complex values, one for each of the respective frequency components (at the n frequencies con). For a frequency component at frequency $\omega_n$, a complex value $H_n$ may be represented as follows in Equation (5):

$$H_n = \Sigma_k c_n \alpha_{n,k} e^{j\phi_{n,k}} \quad (5)$$

$H_n$ for a given $\omega_n$ indicates a relative magnitude and phase offset of the received signal at that $\omega_n$. When an object moves in the space, $H_n$ changes due to $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \Sigma_k \Sigma_{n=-\infty}^{\infty} \alpha_{n,k} \quad (6)$$

In some instances, the channel response $h_{ch}$ for a space can be determined, for example, based on the mathematical theory of estimation. For instance, a reference signal $R_{ef}$ can be modified with candidate $h_{ch}$, and then a maximum likelihood approach can be used to select the candidate channel which gives best match to the received signal ($R_{cvd}$). In some cases, an estimated received signal ($\hat{R}_{cvd}$) is obtained from the convolution of $R_{ef}$ with the candidate $h_{ch}$, and then the channel coefficients of $h_{ch}$ are varied to minimize the squared error of $\hat{R}_{cvd}$. This can be mathematically illustrated as follows in Equation (7):

$$R_{cvd} = R_{ef} \otimes h_{ch} = \Sigma_{k=-m}^{m} R_{ef}(n-k) h_{ch}(k) \quad (7)$$

with the optimization criterion $$\min_{h_{ch}} \sum (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
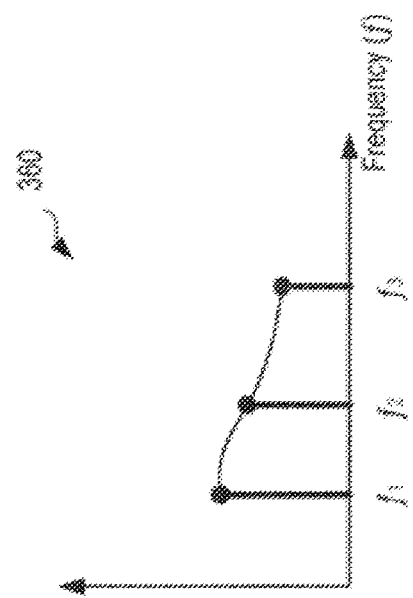
FIG. 3A and FIG. 3B are plots showing examples of channel responses computed from the wireless signals communicated between wireless communication devices in FIG. 2A and FIG. 2B.
Figure 3A:
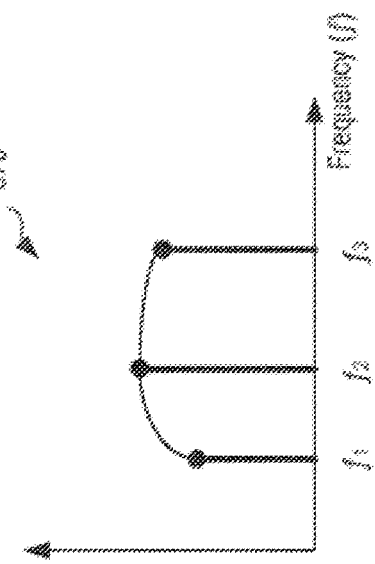
Figure 3B:
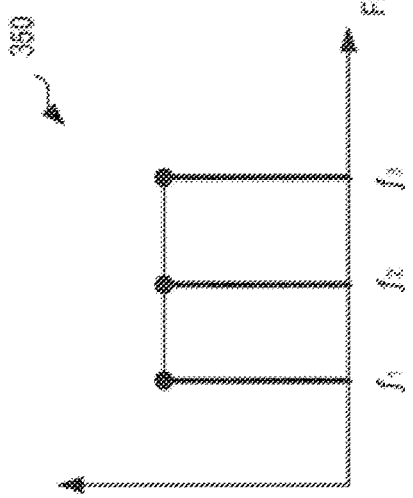
Figure 3B:
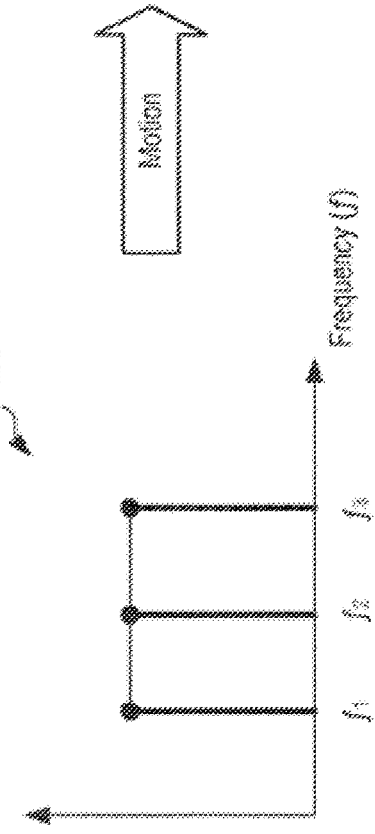

FIG. 3A and FIG. 3B are plots showing examples of channel response 360 and channel response 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel response 360 channel response 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
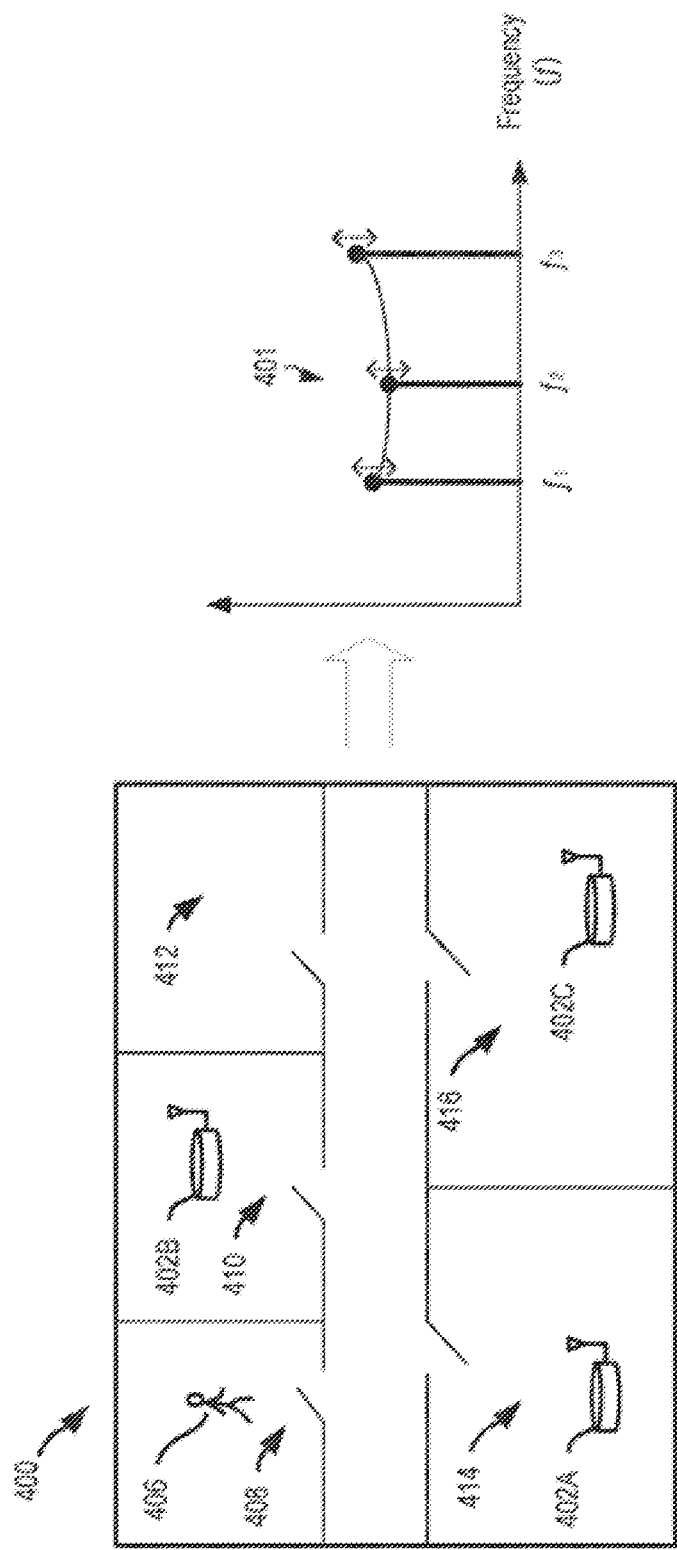
FIG. 4A and FIG. 4B are diagrams showing example channel responses associated with motion of an object in distinct regions of a space.
Figure 4B:
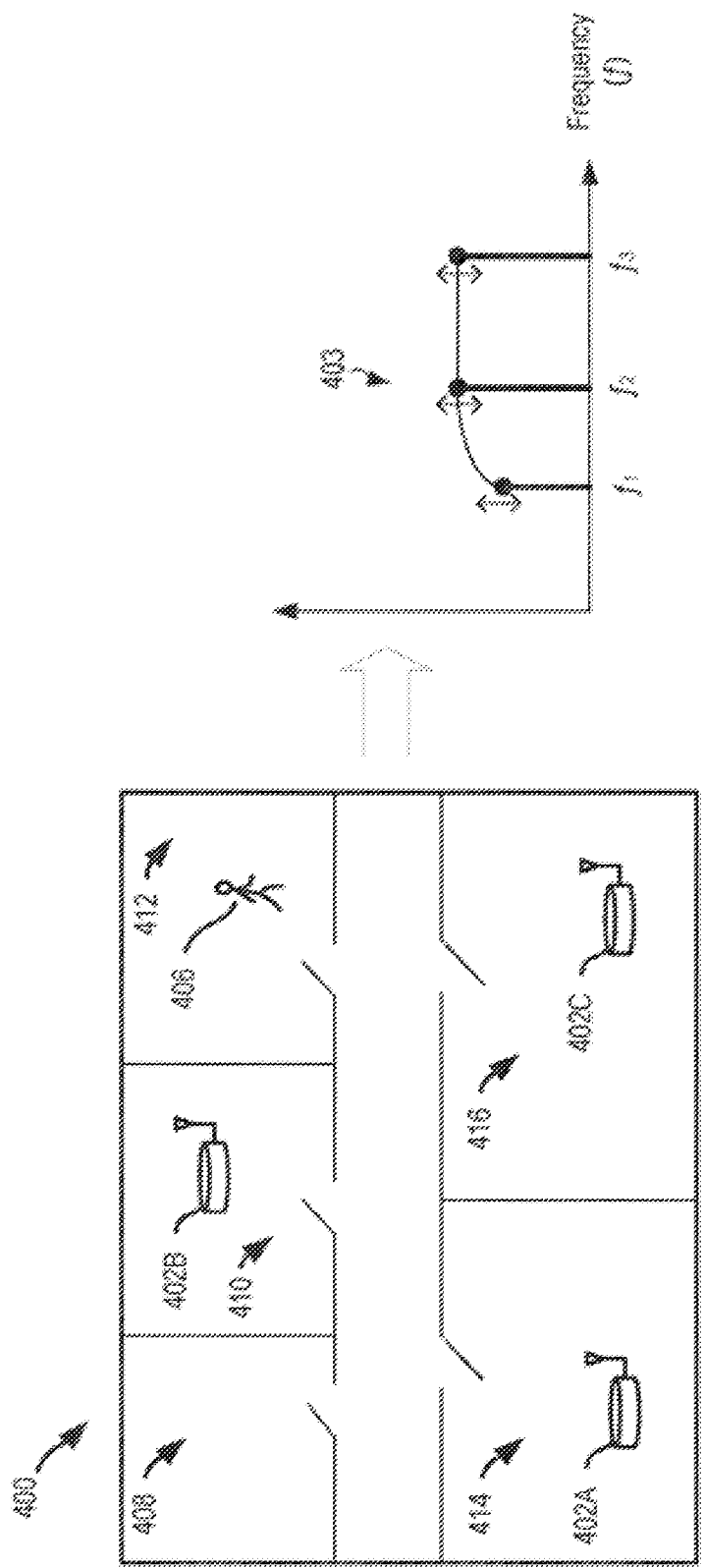

FIG. 4A and FIG. 4B are diagrams showing example channel response 401 and channel response 403 associated with motion of object 406 in distinct regions, first region 408 and third region 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$, and $f_3$ is the same or nearly the same. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel response 401 and channel response 403 are associated with signals received by the same wireless communication device 402 in space 400.

FIG. 4C and FIG. 4D are plots showing channel responses 401, 403 of FIG. 4A and FIG. 4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained artificial intelligence (AI) model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each of $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_1$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an AI model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Systems and Methods for Wi-Fi Sensing

The following describes systems and methods for Wi-Fi sensing. The present disclosure relates to configuring Wi-Fi systems to perform Wi-Fi sensing whilst minimizing overheads and impact to Wi-Fi system performance.

The systems and methods of the present disclosure provide a delivery mechanism that allows transmissions to be made for Wi-Fi sensing. In an implementation, an optimized set of messages and protocols are provided for management, control, and delivery of a series of sensing transmissions at precise times. Further, the systems and methods leverage a sensing device that may be configured to control a measurement campaign. In an implementation, the systems and the methods also leverage a remote device. The remote device may be configured to make sensing transmissions and the sensing device may be configured to compute sensing measurements based on the sensing transmissions. In an implementation, the sensing measurements may be further processed for the purpose of achieving the objectives of the measurement campaign.

According to an implementation, the sensing device may initiate a WLAN sensing session and the remote device may participate in the WLAN sensing session initiated by the sensing device. In some implementations, the remote device may transmit PPDUs which are used for sensing measurements in the WLAN sensing session. In an implementation, the sensing device may receive the PPDUs in the WLAN sensing session and process the PPDUs into the sensing measurements.

Figure 5:
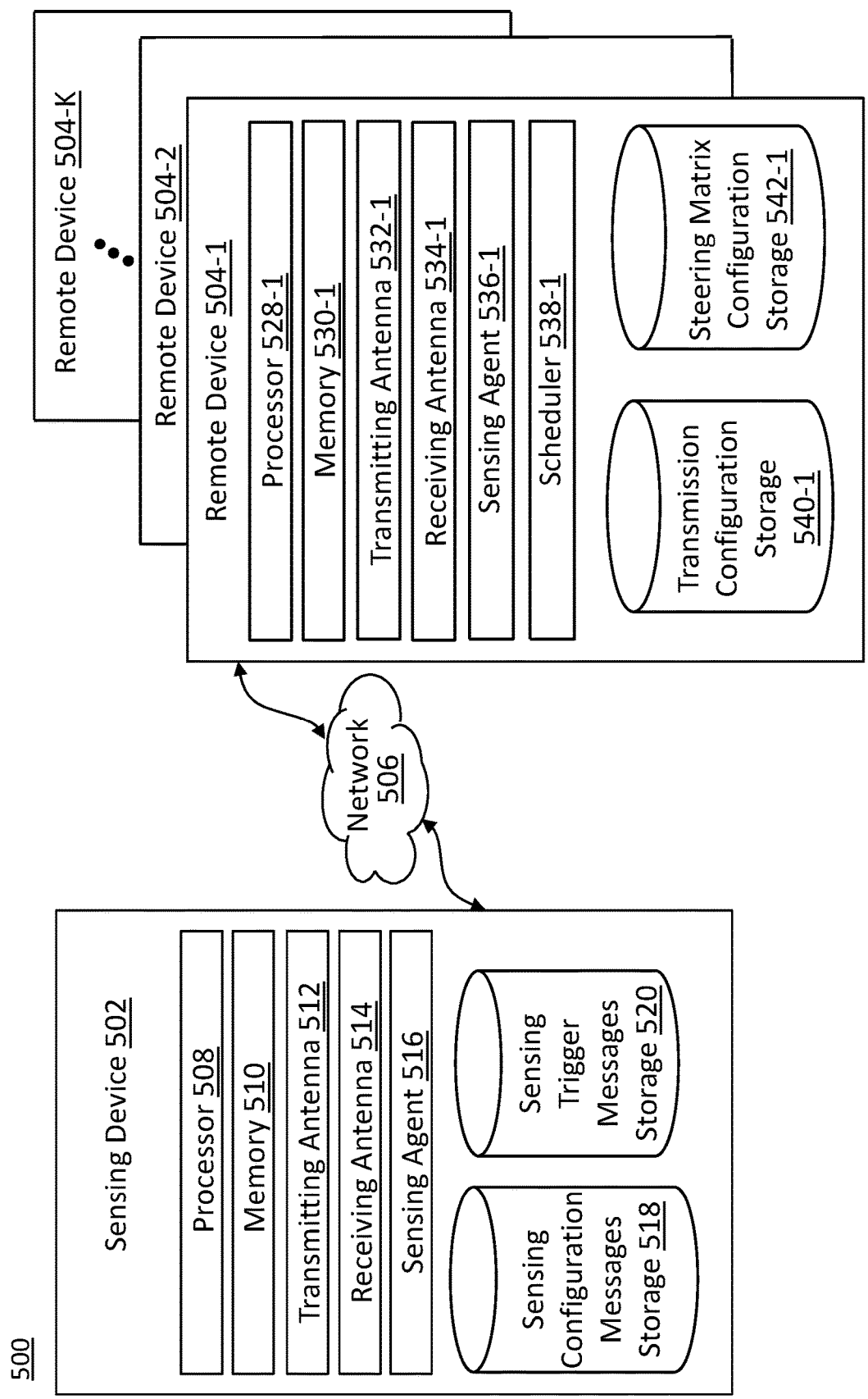
FIG. 5 depicts an implementation of some of an architecture of an implementation of a system for Wi-Fi sensing, according to some embodiments.

FIG. 5 depicts an implementation of some of an architecture of an implementation of system 500 for Wi-Fi sensing, according to some embodiments.

System 500 may include sensing device 502, plurality of remote devices 504-(1-K) (collectively referred to as remote device 504), and network 506 enabling communication between the system components for information exchange. System 500 may be an example or instance of wireless communication system 100 and network 506 may be an example or instance of wireless network or cellular network, details of which are provided with reference to FIG. 1 and its accompanying description.

According to some embodiments, sensing device 502 may be configured to receive a transmission and perform one or more receiver measurements (for example, CSI) useful for Wi-Fi sensing. These measurements may be known as sensing measurements. In an embodiment, sensing device 502 may be an Access Point (AP). In some embodiments, sensing device 502 may be a Station (STA), for example, in a mesh network scenario. According to an implementation, sensing device 502 may be implemented by a device, such as wireless communication device 102 shown in FIG. 1. In some implementations, sensing device 502 may be implemented by a device, such as wireless communication device 204 shown in FIG. 2A and FIG. 2B. Further, sensing device 502 may be implemented by a device, such as wireless communication device 402 shown in FIG. 4A and FIG. 4B. In an implementation, sensing device 502 may coordinate and control communication among remote devices 504-(1-K). According to an implementation, sensing device 502 may be enabled to control a measurement campaign to ensure that required sensing transmissions are made at a required time to achieve the goals of the measurement campaign. Sensing device 502 may process sensing measurements further or in another embodiment it may be configured to transmit the sensing measurements to another device which is configured to process sensing measurements to achieve the goal of the Wi-Fi sensing system.

Referring again to FIG. 5, in some embodiments, remote device 504-1 may be configured to send a transmission based on which one or more sensing measurements (for example, CSI) may be performed for Wi-Fi sensing. In an embodiment, remote device 504-1 may be an STA. In some embodiments, remote device 504-1 may be an AP for Wi-Fi sensing, for example in scenarios where sensing device 502 acts as STA. According to an implementation, remote device 504-1 may be implemented by a device, such as wireless communication device 102 shown in FIG. 1. In some implementations, remote device 504-1 may be implemented by a device, such as wireless communication device 204 shown in FIG. 2A and FIG. 2B. Further, remote device 504-1 may be implemented by a device, such as wireless communication device 402 shown in FIG. 4A and FIG. 4B. In some implementations, communication between sensing device 502 and remote device 504-1 may happen via Station Management Entity (SME) and MAC Layer Management Entity (MLME) protocols.

Referring to FIG. 5, in more detail, sensing device 502 may include processor 508 and memory 510. For example, processor 508 and memory 510 of sensing device 502 may be processor 114 and memory 116, respectively, as shown in FIG. 1. In an embodiment, sensing device 502 may further include transmitting antenna(s) 512, receiving antenna(s) 514, and sensing agent 516. In some embodiments an antenna may be used to both transmit and receive in a half-duplex format. When the antenna is transmitting, it may be referred to as transmitting antenna 512 and when the antenna is receiving. it may be referred to as receiving antenna 514. It is understood by a person of normal skill in the art that the same antenna may be transmitting antenna 512 in some instances and receiving antenna 514 in other instances. In the case of an antenna array, one or more antenna elements may be used to transmit or receive a signal, for example in a beamforming environment. In some examples, a group of antenna elements used to transmit a composite signal may be referred to as transmitting antenna 512 and a group of antenna elements used to receive a composite signal may be referred to as receiving antenna 514. In examples, each antenna is equipped with its own transmission and receive paths, which may be alternately switched to connect to the antenna depending on whether the antenna is operating as transmitting antenna 512 or receiving antenna 514, In an implementation, sensing agent 516 (in examples, also known as Wi-Fi sensing agent or sensing application) may be an application layer program that passes physical layer parameters (e.g., such as CSI) from the Medium Access Control (MAC) of sensing device 502 to an application layer or another higher layer, and which uses the physical layer parameters to detect or determine movement and/or motion. According to some implementations, sensing agent 516 may include/execute a sensing algorithm. In an implementation, sensing agent 516 may process and analyze the sensing measurement using the sensing algorithm, and make sensing decisions, such as detecting motions or gestures. In an example, sensing agent 516 may be enabled to process sensing measurements into motion or context-aware information. Further, sensing agent 516 may be configured to determine a number and timing of sensing transmissions and sensing measurements for the purpose of Wi-Fi sensing. In some implementations, sensing agent 516 may be configured to transmit sensing measurements to another device (or other devices) for further processing.

In an implementation, sensing agent 516 may be configured to cause at least one transmitting antenna of transmitting antenna(s) 512 to transmit messages to remote device 504-1. Further, sensing agent 516 may be configured to receive, via at least one receiving antenna of receiving antennas(s) 514, messages from remote device 504-1. In an example, sensing agent 516 may be configured to make sensing measurements based on sensing transmissions received from remote device 504-1. According to an implementation, sensing agent 516 may be configured process and to analyze the sensing measurements to make sensing decisions, such as detecting movements and/or motions.

In some embodiments, sensing device 502 may include sensing configuration messages storage 518 and sensing trigger messages storage 520. Sensing configuration messages storage 518 may store sensing configuration messages transmitted by sensing device 502 to remote device 504-1. Further, sensing trigger messages storage 520 may store sensing trigger messages transmitted by sensing device 502 to remote device 504-1. Information related to the sensing configuration messages stored in sensing configuration messages storage 518 and information related to the sensing trigger messages stored in sensing trigger messages storage 520 may be periodically or dynamically updated as required. In an implementation, sensing configuration messages storage 518 and sensing trigger messages storage 520 may include any type or form of storage, such as a database or a file system or coupled to memory 510.

Referring again to FIG. 5, remote device 504-1 may include processor 528-1 and memory 530-1. For example, processor 528-1 and memory 530-1 of remote device 504-1 may be processor 114 and memory 116, respectively, as shown in FIG. 1. In an embodiment, remote device 504-1 may further include transmitting antenna(s) 532-1, receiving antenna(s) 534-1, sensing agent 536-1, and scheduler 538-1. In an implementation, sensing agent 536-1 may be a block that passes physical layer parameters from the MAC of remote device 504-1 to application layer programs. Sensing agent 536-1 may be configured to cause at least one transmitting antenna of transmitting antenna(s) 532-1 and at least one receiving antenna of receiving antennas(s) 536-1 to exchange messages with sensing device 502. In some embodiments an antenna may be used to both transmit and receive in a half-duplex format. When the antenna is transmitting, it may be referred to as transmitting antenna 532-1 and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example in a beamforming environment. In some examples, a group of antenna elements used to transmit a composite signal may be referred to as transmitting antenna 532-1 and a group of antenna elements used to receive a composite signal may be referred to as receiving antenna 534-1. In examples, each antenna is equipped with its own transmission and receive paths, which may be alternately switched to connect to the antenna depending on whether the antenna is operating as transmitting antenna 532-1 or receiving antenna 534-1.

In an implementation, scheduler 538-1 may be coupled to processor 228-1 and memory 230-1. In some embodiments, scheduler 538-1 amongst other units, may include routines, programs, objects, components, data structures, etc., which may perform particular tasks or implement particular abstract data types. Scheduler 538-1 may also be implemented as, signal processor(s), state machine(s), logic circuitries, and/or any other device or component that manipulate signals based on operational instructions.

In some embodiments, scheduler 538-1 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or, the processing unit may be dedicated to performing the required functions. In some embodiments, scheduler 538-1 may be machine-readable instructions that, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 530-1. In an implementation, scheduler 538-1 may be configured to determine when and how the messages are to be exchanged with sensing device 502.

In some embodiments, remote device 504-1 may include transmission configuration storage 540-1 and steering matrix configuration storage 542-1. Transmission configuration storage 540-1 may store requested transmission configuration delivered by sensing device 502 to remote device 504-1 or delivered transmission configuration delivered by remote device 504-1 to sensing device 502. Further, steering matrix configuration storage 542-1 may store one or more predefined steering matrix configurations. Information regarding transmission configuration stored in transmission configuration storage 540-1 and information regarding the one or more predefined steering matrix configurations stored in steering matrix configuration storage 542-1 may be periodically or dynamically updated as required. In an implementation, transmission configuration storage 540-1 and steering matrix configuration storage 542-1 may include any type or form of storage, such as a database or a file system or coupled to memory 530-1.

According to one or more implementations, communications in network 506 may be governed by one or more of the 802.11 family of standards developed by IEEE. Some example IEEE standards may include IEEE P802.11-REVmd/D5.0, IEEE P802.11ax/D7.0, and IEEE P802.11be/D0.1. In some implementations, communications may be governed by other standards (other or additional IEEE standards or other types of standards). In some embodiments, parts of network 506 which are not required by system 500 to be governed by one or more of the 802.11 family of standards may be implemented by an instance of any type of network, including wireless network or cellular network.

According to one or more implementations, for the purpose of Wi-Fi sensing, sensing device 502 may initiate a measurement campaign. In the measurement campaign, exchange of transmissions between sensing device 502 and remote device 504-1 may occur. In an example, control of these transmissions may be with the MAC (Medium Access Control) layer of the IEEE 802.11 stack. In one implementation, remote device 504-1 may be unknown to sensing device 502. Accordingly, sensing device 502 may query remote device 504-1 for transmission capability regarding transmission parameters that remote device 504-1 can support for the measurement campaign. In another example, sensing device 502 may query remote device 504-1 for transmission capability regarding transmission parameters that remote device 504-1 can support for the measurement campaign without providing any pre-configuration information.

According to an implementation, following authentication and association of remote device 504-1 with network 506, sensing agent 516 may discover remote device 504-1 and transmission (or sensing) capability of remote device 504-1. In an implementation, sensing agent 516 may send a message to remote device 504-1 via transmitting antenna 512 to query the transmission capability of remote device 504-1. In an example, sensing agent 516 may query the transmission capability of remote device 504-1 by transmitting a sensing configuration message to remote device 504-1 via transmitting antenna 512. In an example, sensing device 502 may contact remote device 504-1 using an empty sensing configuration message to prompt a response to determine a transmission capability of remote device 504-1.

In an implementation, the sensing configuration message may include data elements. In an example, the sensing configuration message may include one of a configuration query indication and a requested transmission configuration corresponding to the requirements of the measurement campaign (or a sensing transmission). The configuration query indication may be indicative of a request or query for transmission capability of remote device 504-1. In an implementation, sensing agent 516 may store the sensing configuration message transmitted to remote device 504-1 in sensing configuration messages storage 518. In another example, the inclusion of a requested transmission configuration corresponding to the requirements of the measurement campaign (or a sensing transmission) may be considered to be a sensing configuration query indication. In some implementations, the sensing configuration message may include no data elements.

According to an implementation, sensing agent 536-1 may receive the sensing configuration message from sensing device 502 via receiving antenna 534-1. In an implementation, in response to receiving the sensing configuration message including the configuration query indication, sensing agent 536-1 analyzes the configuration query indication and sends a sensing configuration response message including a transmission capability indication associated with remote device 504-1. In an example, the transmission capability indication may include a transmission capability of remote device 504-1. In some implementations, sensing agent 536-1 may receive the sensing configuration message including the requested transmission configuration. Sensing agent 536-1 may analyze the requested transmission configuration and determine that the transmission capability of remote device 504-1 corresponds to the requested transmission configuration. In an example, based on the transmission capability of remote device 504-1, sensing agent 536-1 may determine whether remote device 504-1 can support each configuration element of the requested transmission configuration. In some examples, configuration elements may be inter-dependent, in which case sensing agent 536-1 may determine the supported configuration elements in combination.

According to an implementation, sensing agent 536-1 may send a sensing configuration response message including a delivered transmission configuration corresponding to the transmission capability of remote device 504-1 to sensing device 502. In an example, sensing agent 536-1 may indicate in the delivered transmission configuration, configuration elements of the required transmission configuration, that remote device 504-1 can support. In an implementation, sensing agent 536-1 may send the sensing configuration response message to sensing device 502 via transmitting antenna 532-1. According to a non-limiting example, sensing agent 516 may transmit the sensing configuration message to remote device 504-1 requiring a sensing transmission in 5 GHz frequency band with a bandwidth of 40 MHz and using four transmitting antennas. In response to the requirement, sensing agent 536-1 may send the sensing configuration response message indicating that remote device 504-1 supports 2.4 GHz frequency band and implements two transmitting antennas.

In an implementation, sensing agent 536-1 may store the delivered transmission configuration in transmission configuration storage 540-1 as a default transmission configuration. In an example, the stored delivered transmission configuration may be used for any measurement campaign where there is no requested transmission configuration provided. In some implementations, sensing agent 516 may configure transmission parameters for the measurement campaign for remote device 504-1 using the delivered transmission configuration.

According to an implementation, upon initial association of remote device 504-1 with sensing device 502, or upon determining the transmission capabilities of remote device 504-1, sensing agent 516 may transmit a sensing configuration message including one or more predefined steering matrix configurations identifiable by an index to remote device 504-1. In an example, sensing agent 516 may store the one or more predefined steering matrix configurations, for example, as a look-up table and the index may allow remote device 504-1 to look-up using the index. In an example, sensing agent 516 may transmit the sensing configuration message including the one or more predefined steering matrix configurations to remote device 504-1 via transmitting antenna 512. In an example, sensing agent 516 may transmit the one or more predefined steering matrix configurations using a broadcast message.

In an implementation, sensing agent 536-1 may receive the sensing configuration message including the one or more predefined steering matrix configurations from sensing device 502 via receiving antenna 534-1. In an example, sensing agent 536-1 may receive the sensing configuration message as the broadcast message. Sensing agent 536-1 may then decode the sensing configuration message to determine the one or more predefined steering matrix configurations. In an implementation, sensing agent 536-1 may store the one or more predefined steering matrix configurations in steering matrix configuration storage 542-1. In an example, sensing agent 536-1 may store a predefined steering matrix configuration as the default transmission configuration. For example, the stored predefined steering matrix configuration may be used for any measurement campaign where there is no requested transmission configuration provided. In some implementations, the one or more predefined steering matrix configurations may be set up for remote device 504-1 as a part of an initial pre-configuration of remote device 504-1 by sensing device 502.

According to an implementation, in response to receiving the sensing configuration message including the one or more predefined steering matrix configurations, sensing agent 536-1 may send a sensing configuration response message including a steering matrix configuration acknowledgement associated with remote device 504-1. In an implementation, sensing agent 536-1 may send the sensing configuration response message to sensing device 502 via transmitting antenna 532-1. In an example, sensing agent 536-1 may send a null sensing configuration response message as an acknowledgement that the one or more predefined steering matrix configurations have been applied or stored in steering matrix configuration storage 542-1. In an implementation, if the sensing configuration message does not include the one or more predefined steering matrix configurations, sensing agent 536-1 may respond with its antenna configuration, for example, number of transmit/receive chains, number of antennas, digital/analog beamforming capabilities, and other information associated with the antenna configurations. In an implementation, sensing agent 516 may request for transmission configuration of remote device 504-1 by sending the index into a table of the one or more predefined steering matrix configurations. In an example, the one or more predefined steering matrix configurations may correspond to a number of lookup table entries that the sensing configuration message is configuring. In an example, the index may be used to locate the corresponding look-up table entries.

According to an implementation, sensing agent 516 may receive the sensing configuration response message from remote device 504-1 via receiving antenna 514. In an implementation, in response to receiving the sensing configuration response message from remote device 504-1, sensing agent 516 may initiate a sensing transmission. In an implementation, sensing agent 516 may initiate the sensing transmission based on transmission parameters (for example, the transmission capability and the requested transmission configuration) that sensing agent 516 requires remote device 504-1 to use. In an implementation, based on the remote device transmission capability and/or requested transmission configuration, sensing agent 516 may generate a sensing trigger message. In an example, the sensing trigger message may include a requested transmission configuration not exceeding a remote device transmission capability. For example, if remote device 504-1 supports 2.4 GHz frequency band and implements two transmitting antennas, then sensing agent 516 may generate the sensing trigger message requiring a sensing transmission in 2.4 GHz frequency band using two transmitting antennas. In an implementation, sensing agent 516 may transmit the sensing trigger message to remote device 504-1 via transmitting antenna 512. In some implementations, sensing agent 516 may store the transmitted sensing trigger message in sensing trigger messages storage 520.

In an implementation, sensing agent 536-1 may receive the sensing trigger message from sensing device 502 via receiving antenna 534-1. In some implementations, sensing agent 536-1 may apply the requested transmission configuration included in the sensing trigger message. Subsequently, sensing agent 536-1 may transmit a sensing transmission to sensing device 502 in response to the sensing trigger message and in accordance with the requested transmission configuration. In an implementation, sensing agent 536-1 may transmit the sensing transmission to sensing device 502 via transmitting antenna 532-1.

In some scenarios, the sensing trigger message may not include requested transmission configuration and no pre-configuration may be made. In such scenarios, sensing agent 536-1 may automatically apply the stored default transmission configuration (i.e., the delivered transmission configuration, including a default steering matrix configuration stored in transmission configuration storage 540-1 and steering matrix configuration storage 542-1, respectively) to the sensing transmission in response to the sensing trigger message. According to one or more implementations, sensing agent 536-1 may apply the stored default transmission configuration unless default transmission configuration is superseded by a requested transmission configuration in a new sensing trigger message or redefined by a new sensing configuration message.

In some implementations, sensing agent 536-1 may ignore the sensing trigger message if no requested transmission configuration and no pre-configuration has been made in the sensing trigger message.

According to one or more implementations, sensing agent 536-1 may generate one of a sensing response message and a sensing response NDP as a sensing transmission in response to the sensing trigger message. In an implementation, sensing agent 536-1 may generate the sensing response message when the requested transmission configuration supports data transfer. In some implementations, sensing agent 536-1 may generate a sensing response announcement when the requested transmission configuration does not support data transfer. In another implementation, sensing agent 536-1 may always generate a sensing response announcement independent of the requested transmission configuration. In an implementation, the sensing response message and the sensing response announcement may include delivered transmission requirements which describe the transmission parameters which remote device 504-1 may use when transmitting the sensing transmission.

According to an implementation, the sensing response announcement may include delivered transmission configuration that will be applied to the sensing response NDP. In an implementation, sensing agent 536-1 may generate the sensing response NDP which may be transmitted after one SIFS of the sensing response announcement. In an example, the sensing response NDP may be the sensing transmission from which sensing device 502 may make a sensing measurement. In an implementation, sensing agent 536-1 may transmit the sensing response NDP and the sensing response announcement to sensing device 502 via transmitting antenna 532-1. According to an implementation, prior to transmitting the sensing response NDP, sensing agent 536-1 may apply remote device transmission parameters corresponding to the delivered transmission configuration to remote device 504-1.

According to some implementations, sensing agent 516 may generate the sensing trigger message including requested timing configuration. The requested timing configuration may be indicative of timing requirements for the measurement campaign including a series of sensing transmissions from remote device 504-1 to sensing device 502. In an example, sensing agent 516 may initiate a periodic series of sensing transmissions via the sensing trigger message. Accordingly, a single sensing trigger message may trigger more than one sensing transmission by remote device 504-1. In an example, periodic sensing transmissions may allow for frequent and predictable sensing measurements. In one example, sensing agent 516 may initiate a semi-periodic series of sensing transmissions via the sensing trigger message. In an implementation, sensing agent 516 may transmit the sensing trigger message including the requested timing configuration to remote device 504-1 via transmitting antenna 512.

According to one or more implementations, sensing agent 536-1 may receive the sensing trigger message including the requested timing configuration from sensing device 502 via receiving antenna 534-1. In response to receiving the sensing trigger message, sensing agent 536-1 may transmit a series of sensing transmissions according to requested timing configuration. In an implementation, initially, sensing agent 536-1 may respond with a first sensing transmission. Subsequently, sensing agent 536-1 may respond with identical sensing transmissions (for example, a second sensing transmission, a third sensing transmission, and so on) at the period defined by the requested timing configuration. In an implementation, sensing agent 536-1 may respond to the sensing trigger message with the sensing transmission including a sensing response message. For example, sensing agent 536-1 may send identical sensing response messages at the period defined by the requested timing configuration. In some implementations, sensing agent 536-1 may respond to the sensing trigger message with the sensing transmission including a sensing response announcement followed by a sensing response NDP after one SIFS. In an example, sensing agent 536-1 may send identical sensing response NDP transmissions at the period defined by the requested timing configuration. In some implementations, if no requested timing configuration is included in the sensing trigger message, then the sensing trigger message may initiate a single sensing transmission within a predefined time period.

In an implementation, sensing agent 536-1 may be configured to halt the series of sensing transmissions when the requested timing configuration is fulfilled, or when a new sensing trigger message is received. In an example, sensing agent 536-1 may continue to produce sensing transmissions until the requirements of requested timing configuration are exhausted or until a new measurement campaign or a sensing transmission is initiated. Transmission of a series of sensing response messages in response to a sensing trigger message is illustrated in a sequence diagram depicted in FIG. 6 and transmission of a series of sensing response announcement in response to a sensing trigger message is illustrated in a sequence diagram depicted in FIG. 7.

Figure 6:
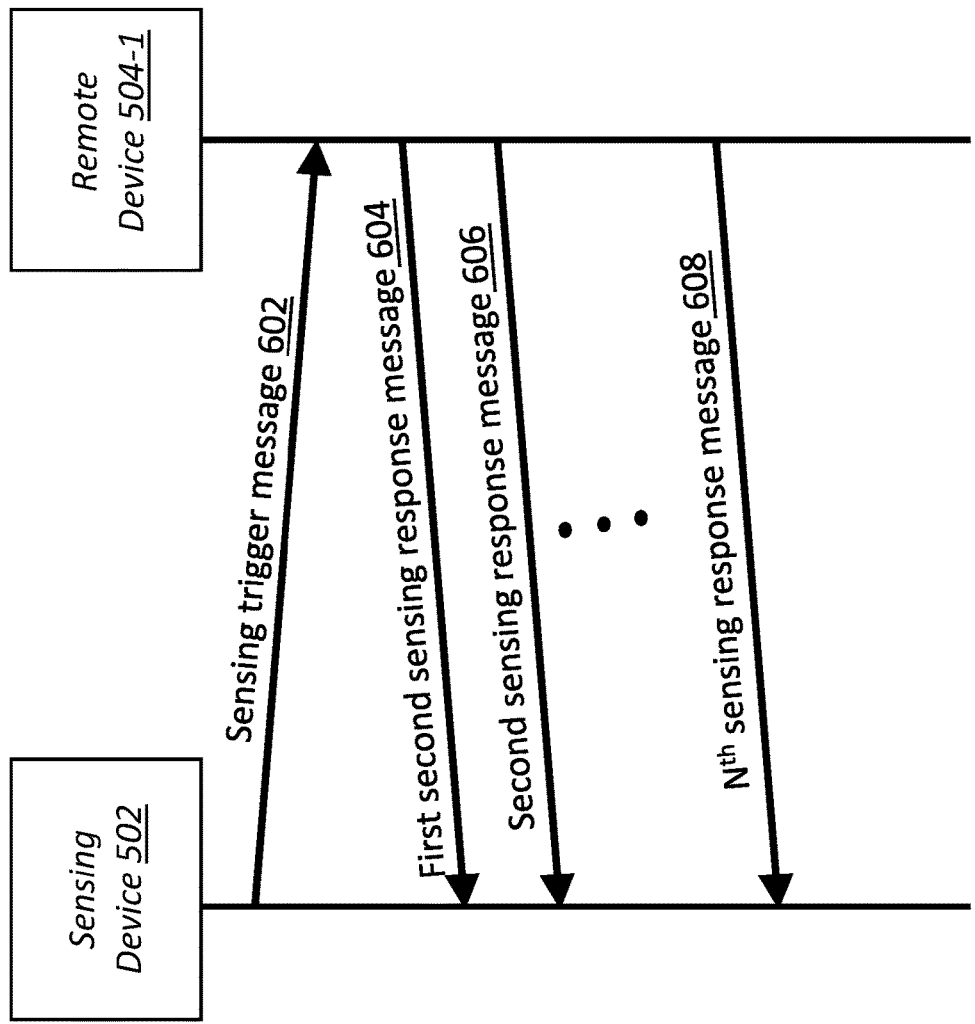
FIG. 6 depicts a sequence diagram for transmission of a series of sensing response messages in response to a sensing trigger message, according to some embodiments.

As shown in FIG. 6, at step 602, sensing device 502 may transmit a sensing trigger message to remote device 504-1. In an example, the sensing trigger message may include requested timing configuration. The requested timing configuration may be indicative of timing requirements for a measurement campaign including a series of sensing transmissions, for example, N sensing transmissions from remote device 504-1 to sensing device 502. In an example, the sensing trigger message may indicate that time interval between two sensing transmissions should be 50 milliseconds.

At step 604, in response to sensing trigger message, remote device 504-1 may transmit first sensing response message. At step 606, remote device 504-1 may transmit second sensing response message in response to sensing trigger message and according to requested timing configuration. In an example, remote device 504-1 may transmit second sensing response message 50 milliseconds after transmitting first sensing response message. At step 608, remote device 504-1 may transmit $N^{th}$ sensing response message.

Figure 7:
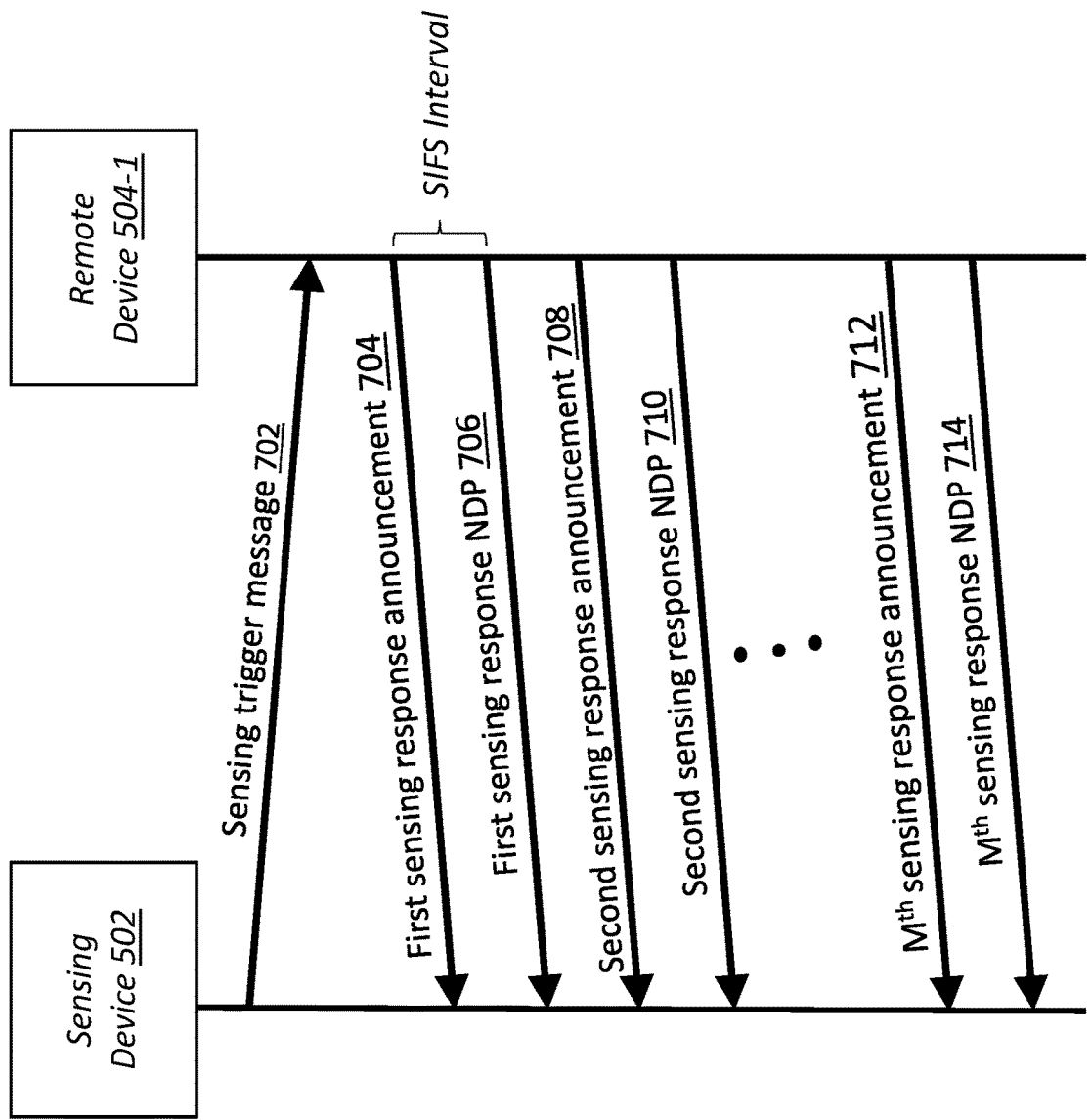
FIG. 7 depicts a sequence diagram for transmission of a series of sensing response announcements and sensing response NDPs in response to a sensing trigger message, according to some embodiments.

As shown in FIG. 7, at step 702, sensing device 502 may transmit sensing trigger message to remote device 504-1. In an example, sensing trigger message may include the requested timing configuration indicative of timing requirements for a measurement campaign including a series of sensing transmissions, for example, M sensing transmissions, from remote device 504-1 to sensing device 502. In an example, the sensing trigger message may indicate that time interval between two sensing transmissions should be 10 seconds.

At step 704, in response to the sensing trigger message, remote device 504-1 may transmit first sensing response announcement. At step 706, remote device 504-1 may transmit first sensing response NDP after one SIFS. In an example, the duration of SIFS is 10 µs. At step 708, remote device 504-1 may transmit second sensing response announcement. In an example, remote device 504-1 may transmit the second sensing response announcement 10 seconds after transmitting first sensing response announcement 704. At step 710, remote device 504-1 may transmit second sensing response NDP. At step 712, remote device 504-1 may transmit $M^{th}$ sensing response announcement, and at step 714, remote device 504-1 may transmit $M^{th}$ sensing response NDP.

According to an implementation, sensing agent 516 may initiate a sensing transmission with a specification of steering matrix configuration that sensing device 502 requires remote device 504-1 to use. In an implementation, sensing agent 516 may generate a sensing trigger message with a specification of the steering matrix configuration included. In an implementation, the sensing trigger message may include the steering matrix configuration within the requested transmission configuration. In an example, the steering matrix configuration may include an index into a set or table of preconfigured/predefined steering matrix configurations which was previously sent from sensing device 502 to remote device 504-1 and stored in steering matrix configuration storage 542-1. In examples, when the steering matrix configuration includes an index to the set of preconfigured steering matrix configurations stored at remote device 504-1 and the index is set to a known value, for example a maximum value or minimum value, then this may indicate to the remote device 504-1 that a default preconfigured steering matrix configuration is to be used for the sensing transmission. According to an implementation, when sensing device 502 requests for remote device transmission configuration by sending an index into the table of preconfigured steering matrix configurations rather than sending steering matrix configuration in the sensing trigger message, the amount of signaling required to be sent from sensing device 502 to remote device 504-1 when configuring the measurement campaign or the sensing transmission may be reduced significantly.

According to an aspect of the present disclosure, for the purposes of Wi-Fi sensing, an existing queued non-sensing message may be utilized. The process of aggregating another message along with the queued non-sensing message may be referred to as frame aggregation. In an implementation, to reduce overhead caused by additional messages and to preserve bandwidth for data transfer whilst also supporting the Wi-Fi sensing, some aspects of the present disclosure rely on frame aggregation.

Figure 8A:
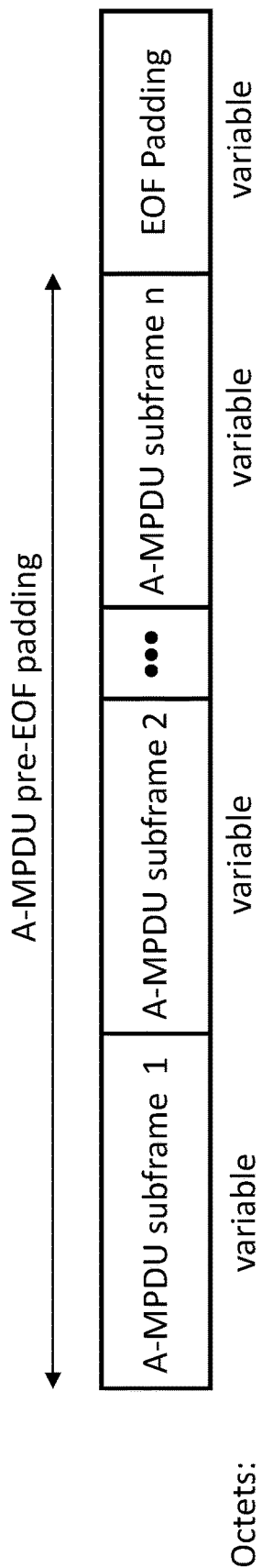
FIG. 8A illustrates a structure of an Aggregated-Medium Access Control (MAC)-layer Protocol Data Unit (A-MPDU) frame, according to some embodiments.
Figure 8B:
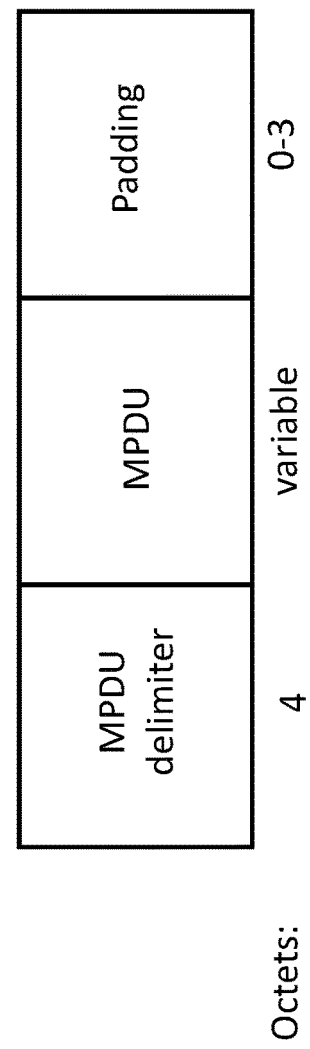
FIG. 8B illustrates a structure of an A-MPDU subframe, according to some embodiments.

IEEE P802.11-REVmd/D5.0 defines two types of frame aggregation: A-MPDU aggregation and A-MSDU aggregation. Frame aggregation allows for multiple MPDUs or MSDUs to be carried in the same PPDU thereby saving the overhead of transmitting and receiving multiple PPDUs. In an implementation, a measurement campaign may depend on data carried within a frame header and so frames are aggregated using A-MPDU. FIG. 8A describes a structure of an A-MPDU frame and FIG. 8B describes a structure of an A-MPDU subframe according to IEEE P802.11-REVmd/D5.0 standard. As shown in FIG. 8A, the A-MPDU includes a sequence of one or more A-MPDU subframes and a variable amount of EOF (End of Frame) padding. Further, as shown in FIG. 8B, in A-MPDU subframe, an MPDU delimiter is prepended to an MPDU and padding are appended to the MPDU.

In an implementation, when sensing device 502 initiates a sensing message for remote device 504-1, sensing agent 516 may determine whether there is a non-sensing message scheduled or queued to be transmitted to remote device 504-1. On determining the queued non-sensing message, sensing agent 516 may aggregate or incorporate a sensing message with the queued non-sensing message. In an example, the sensing message may be a sensing trigger message which may include one of requested transmission configuration, requested timing configuration, and predefined steering matrix configuration. According to an implementation, sensing agent 516 may incorporate the sensing trigger message into the queued non-sensing message using one of an A-MPDU format or a Multi-Traffic Identifier (TID) A-MPDU format defined in at least IEEE P802.11-REVmd/D5.0, § 9.7 and IEEE P802.11ax/D7.0, § 26.6.3, respectively. According to an implementation, multi TID allows aggregation of MPDUs with different QoS access categories in a single frame.

The non-sensing message into which the sensing trigger message is incorporated may now be referred to as an aggregated message. In an example, the sensing trigger message may be incorporated into the queued non-sensing message as the first frame to allow for faster or more deterministic detection of the sensing trigger message by remote device 504-1 as remote device 504-1 may not be required to process the entire aggregated message before scheduling a sensing transmission (using for example, a sensing response message or a sensing response NDP).

According to an implementation, on determining that there is no non-sensing message scheduled or queued to be transmitted to remote device 504-1, sensing agent 516 may prepare the sensing trigger message as a dedicated sensing trigger message which may be sent as a sensing transmission to remote device 504-1.

In an implementation, when a sensing transmission from remote device 504-1 is required, for example in response to receiving the sensing trigger message from sensing device 502, scheduler 538-1 may determine whether there is a non-sensing message queued to be transmitted to sensing device 502 and whether the requested transmission configuration supports data transfer. On determining that there is a queued non-sensing message and that the requested transmission configuration supports data transfer, scheduler 538-1 may incorporate sensing response message or sensing response announcement into the queued non-sensing message creating an aggregated message. In an embodiment, a requested transmission configuration that supports data transfer may mean that it is compatible with the data transfer configuration that scheduler 538-1 is using for the queued non-sensing message. In an example, the queued non-sensing message may include one of delivered transmission configuration and steering matrix configuration applied. According to an implementation, scheduler 538-1 may incorporate the sensing response message or the sensing response announcement into the queued non-sensing message using one of an A-MPDU format or a Multi-Traffic Identifier (TID) A-MPDU format. The aggregated message may be transmitted using one or more of the requested transmission configuration and the transmission matrix configuration.

In an implementation, the sensing response message or sensing response announcement may be incorporated into the queued non-sensing message as the first frame to allow for faster or more deterministic execution of the sensing measurement by sensing device 502 as sensing device 502 may not be required to process the entire aggregated message before performing the sensing measurement.

According to an implementation, on determining that there is no non-sensing message scheduled for transmission to sensing device 502, scheduler 538-1 may prepare the sensing response message as a dedicated sensing response message or the sensing response announcement as a dedicated sensing response announcement which may be sent to sensing device 502.

IEEE P802.11-REVmd/D5.0 defines that all MPDUs aggregated in the same A-MPDU frame must be transmitted with the same QoS access category. Accordingly, in an implementation, the sensing configuration message and the sensing trigger message from sensing device 502, and the sensing response message and the sensing announcement message from remote device 504-1 may be assigned the QoS access category of the data MPDUs which are present in the frame scheduled for transmission.

In examples where it is determined that Multi-TID aggregation is supported, it may be possible to aggregate MPDUs together in the same A-MPDU that do not share the same QoS access category. In an example, scheduler 538-1 may send sensing MPDU, such as the sensing configuration message MPDU or the sensing trigger message MPDU from sensing device 502 or sensing response message MPDU or sensing announcement message MPDU from remote device 504-1 at the QoS access category equal to that of highest priority MPDU in the complete, aggregated frame. In another example, the QoS access category of the sensing trigger message may be determined by sensing agent 536.

According to an implementation, the steering matrix configuration may describe a plurality of beamforming weights to be applied to one or more sensing transmissions by spatial mapper of remote device 504-1. In an example, the spatial mapper may be a block in the transmitter signal chain which applies beamforming weights according to the steering matrix configuration. In an implementation, when remote device 504-1 is making a sensing transmission, sensing device 502 may request the steering matrix configuration that is applied by the spatial mapper of remote device 504-1. In an example, there may be one transmitted signal for each transmit path and each antenna is an endpoint of a transmit path. In one or more embodiments, the steering matrix configuration describes the beamforming weights to be applied to each transmitted signal by the spatial mapper for one or more sensing transmissions.

According to an implementation, sensing device 502 may control the spatial mapper of remote device 504-1 for sensing transmission based on at least two mechanisms, namely a first mechanism and a second mechanism. According to the first mechanism, sensing device 502 may control the spatial mapper of remote device 504-1 via an indexed preconfigured table of steering matrix configurations and according to the second mechanism, sensing device 502 may control the spatial mapper of remote device 504-1 via inclusion of an explicit steering matrix configuration as a part of required transmission configuration. Antennas on a Wi-Fi device may not be optimized for precise beamforming and examples described herein may represent the steering matrix configuration of the antenna beam as IEEE half-precision floating point numbers for each of the real (I) and the imaginary (Q) part of each beamforming weight. Other examples of number format that are not discussed here are contemplated herein.

In an implementation, according to the first mechanism of controlling the spatial mapper of remote device 504-1 for sensing transmission, sensing device 502 may pre-configure a table of steering matrix configurations on remote device 504-1 via a sensing configuration message. Sensing device 502 may select which of these preconfigured steering matrix configurations to use for each sensing transmission from remote device 504-1 to sensing device 502 and may indicate the steering matrix configuration to use by using an index. Accordingly, the sensing trigger message may include a selection of the one or more preconfigured steering matrix configurations as the requested transmission configuration.

In an implementation, according to the second mechanism of controlling the spatial mapper of remote device 504-1 for sensing transmission, each time a series of sensing transmissions from remote device 504-1 is triggered by sensing device 502, a complete description of the steering matrix configuration required for sensing transmissions in the series of sensing transmissions may be specified in the configuration of the measurement campaign or in the triggering of the sensing transmission(s) with the sensing trigger message.

In an implementation, remote device 504-1 may be configured to fix the steering matrix configuration for a sensing transmission. In an example, the steering matrix configuration may be a unity matrix. Accordingly, all the applied beamforming weights may be equal for all transmit paths. According to an implementation, sensing device 502 may instruct remote device 504-1 to apply the steering matrix configuration including unity or equal beamforming weights to all transmit paths to use when performing a sensing transmission.

According to an implementation, a sensing trigger message sent by sensing device 502 to remote device 504-1 may include a requested timing configuration or requested transmission configuration. In response to receiving the requested timing configuration, sensing agent 536-1 may determine whether there is a non-sensing message scheduled to be transmitted from remote device 504-1 to sensing device 502. Upon determining the non-sensing message scheduled to be transmitted, sensing agent 536-1 may determine whether the non-sensing message is compliant with the requested timing configuration. Here the term "compliant" may indicate that application of the requested timing configuration and the requested transmission configuration to the non-sensing message transmission does not compromise the successful delivery of the non-sensing message to sensing device 502.

In an implementation, sensing agent 536-1 may be preconfigured with a timing window within which an already-scheduled non-sensing message may be considered as at (or close enough to) the requested time of the sensing transmission. In an example, the requested timing configuration may be extended to include the definition of a timing window that can be specified via the sensing trigger message. In an implementation, with reference to the requested timing configuration, sensing agent 536-1 may determine whether the transmission timing configuration is compatible with the non-sensing message. In an example, sensing agent 536-1 may determine that the transmission timing configuration is compatible with the non-sensing message if aligning the non-sensing message transmission time with the sensing transmission time according to the requested timing configuration does not compromise the required QoS access category of the non-sensing message.

According to an implementation, in response to receiving the sensing trigger including the requested transmission configuration, scheduler 538-1 may generate one of a sensing response message and a sensing response announcement including a delivered transmission configuration. In case when scheduler 538-1 generates the sensing response message, the delivered transmission configuration may include transmission parameters used to transmit the sensing response message. In instances scheduler 538-1 generates the sensing response announcement, the delivered transmission configuration may include transmission parameters of the following sensing response NDP, and not those of the sensing response announcement. In an example, scheduler 538-1 may generate the sensing response message or the sensing response announcement, containing the delivered transmission configuration, irrespective of whether the requested transmission configuration was included in the sensing trigger message.

In scenarios where scheduler 538-1 determines that there is a non-sensing message compliant with both the requested timing configuration and the requested transmission configuration, scheduler 538-1 may generate a sensing response message. In an example, the sensing response message may optionally include the delivered transmission configuration. In an implementation, scheduler 538-1 may aggregate the sensing response message with the scheduled non-sensing message using the A-MPDU or the Multi-TID A-MPDU format. According to an implementation, scheduler 538-1 may transmit the aggregated non-sensing message including the sensing response message to sensing device 502 according to the requested transmission configuration and the requested timing configuration.

According to an implementation, when scheduler 538-1 determines that there is a non-sensing message that is compliant with the requested timing configuration but not the requested transmission configuration, scheduler 538-1 may generate a sensing response announcement. The sensing response announcement may optionally include the delivered transmission configuration equal to the requested transmission configuration and which may be applied to the following sensing response NDP. In an implementation, scheduler 538-1 may aggregate the sensing response announcement with the scheduled non-sensing message using the A-MPDU or the Multi-TID A-MPDU format. According to an implementation, scheduler 538-1 may transmit the aggregated non-sensing message including the sensing response announcement to sensing device 502 according to the requested timing configuration. In an implementation, scheduler 538-1 may reconfigure transmission configuration of remote device 504-1 in accordance with the requested transmission configuration and send the sensing response NDP after one SIFS.

According to an implementation, scheduler 538-1 may determine that there is a non-sensing message which is not compliant with the requested timing configuration. In response to determining that the non-sensing message is not compliant with the requested timing configuration, scheduler 538-1 may determine if the non-sensing message can be delayed or advanced in time to make the non-sensing message compliant with the requested timing configuration. To make the non-sensing message compliant with the requested timing configuration by delaying or advancing in time, scheduler 538-1 may adjust the transmission time of the non-sensing message. In some implementations, the scheduler 538-1 may then use the non-sensing message that has been made compliant with the requested timing configuration to aggregate with the sensing transmission.

In an implementation, scheduler 538-1 may determine whether the requested transmission configuration is likely to result in the successful reception of the non-sensing message. In response to the determination that the requested transmission configuration is likely to result in the successful reception of the non-sensing message, scheduler 538-1 may generate a sensing response message. In an example, the sensing response message may optionally include the delivered transmission configuration of the sensing response message. According to an implementation, scheduler 538-1 may aggregate the sensing response message with the non-sensing message. Subsequently, sensing agent 536-1 may configure transmission parameters in accordance with the delivered transmission configuration and scheduler 538-1 may send the aggregated non-sensing message including the sensing response message to sensing device 502.

According to an implementation, in response to the determination that the requested transmission configuration is not likely to result in the successful reception of the non-sensing message, scheduler 538-1 may generate a sensing response announcement. In an example, the sensing response announcement may optionally include the delivered transmission configuration of the following sensing response NDP. In an implementation, scheduler 538-1 may aggregate the sensing response announcement with the non-sensing message. Subsequently, scheduler 538-1 may send the aggregated non-sensing message including the sensing response announcement to sensing device 502. In an implementation, scheduler 538-1 may send the aggregated non-sensing message using a known optimum transmission configuration. In an example, scheduler 538-1 may send the aggregated non-sensing message using the transmission configuration used for the last non-sensing message. According to an implementation, following the sensing response announcement, scheduler 538-1 may configure transmission parameters in accordance with the delivered transmission configuration and send the sensing response NDP after one SIFS. According to an implementation, sensing device 502 may receive the transmission from remote device 504-1. Sensing agent 516 may receive the transmission and detect the sensing response message or the sensing response announcement from the transmission. In some implementations, sensing agent 516 may unpack the delivered transmission configuration from the sensing response message or the sensing response announcement. In scenarios where the delivered transmission configuration is not present in the sensing response message or the sensing response announcement, sensing agent 516 may assume that the transmission configuration is same as the requested transmission configuration.

According to an implementation, if the sensing transmission from remote device 504-1 is the sensing response message, then sensing agent 516 may compute sensing measurement based on training field that has been configured in the requested transmission configuration or identified in the delivered transmission configuration of the sensing response message. In an implementation, if the sensing transmission from remote device 504-1 is the sensing response announcement, then sensing agent 516 may compute the sensing measurement from the immediately-following sensing response NDP based on the training field that has been configured in the requested transmission configuration or identified in the delivered transmission configuration of the sensing response announcement. In an example, the training field may be considered to be a default training field in scenarios where no delivered transmission configuration is returned.

According to an implementation, sensing device 502 may perform the sensing measurement on the sensing transmission received from remote device 504-1. In some implementations, sensing device 502 may send the sensing measurement that has been performed to another device or application. In an example, the sensing measurement performed by sensing device 502 may be sent to sensing agent 536-1. In an implementation, sensing device 502 may request a TXOP (alternatively referred to as "TXOP request") from remote device 504-1 in order to transfer the performed sensing measurement to remote device 504-1. According to an implementation, when remote device 504-1 grants the TXOP (alternatively referred to as "TXOP grant") to sensing device 502 in response to the TXOP request, sensing device 502 may send the sensing measurement to remote device 504-1 in a sensing response message. In an example, sensing device 502 may utilize transmission parameters corresponding to those which were last used. In an implementation, the TXOP request may include a flag which indicates to remote device 504-1 that sensing device 502 is requesting the TXOP to send the sensing response message in a transmission to remote device 504-1. In this case, remote device 504-1 may include delivered transmission configuration in the TXOP grant, which sensing device 502 may apply when transmitting the sensing response message.

Although various aspects of the present disclosure are described with respect to remote device 504-1, these aspects may equally be applicable to remote device 504-2 to remote device 504-N. In a scenario, sensing transmissions may be transmitted (and received) in sequence from, for example, remote devices 504-1, 504-2, 504-3, and 504-4. In an implementation, sensing device 502 may configure a measurement campaign using a sensing trigger message sent to each of remote device 504-1, 504-2, 504-3, and 504-4. In an example, the sensing trigger message may include the requested timing configuration for each remote device to allow sequential or round-robin sensing transmissions and corresponding sensing measurements.

Although one sensing device 502 is shown in FIG. 5, there may be more than one sensing device. In an example, there may be four sensing devices including sensing device 502. In an implementation, sensing transmissions from remote device 504-1 may be sequentially transmitted to these four sensing devices. According to an implementation, remote device 504-1 may be enabled to independently determine whether remote device 504-1 is able to create a sensing transmission with the requested transmission configuration using already-scheduled non-sensing messages to any of these four sensing devices, or whether remote device 504-1 needs to send a dedicated sensing transmission that is not aggregated with an already-scheduled non-sensing message. In an implementation, if remote device 504-1 does not have any scheduled non-sensing message to be sent to any of the four sensing devices, then remote device 504-1 may transmit a dedicated sensing response message to one or more of the four sensing devices. On receiving the sensing transmission from remote device 504-1, each of the four sensing devices may perform the sensing measurement on the sensing transmission.

According to an implementation, sensing measurements performed by these sensing devices may be transmitted to another device or application. In an example the sensing measurements may be transmitted to remote device 504-1. In an implementation, the transmission of the sensing measurements from these four sensing devices to remote device 504-1 may be accomplished by each of sensing device requesting a TXOP from remote device 504-1. When remote device 504-1 grants TXOPs to the sensing devices in response to the TXOP requests, sensing devices may send the sensing measurements in sensing response messages to remote device 504-1 utilizing transmission parameters corresponding to those last used to send a data transmission to remote device 504-1. In an example, a TXOP request may include a flag which may indicate to remote device 504-1 that the sensing devices are requesting the TXOPs to send sensing response message in a data transmission to remote device 504-1. In an implementation, remote device 504-1 may include delivered transmission configuration in the TXOP grant to the sensing devices, which the sensing devices may apply when transmitting the sensing response message.

Figure 9:
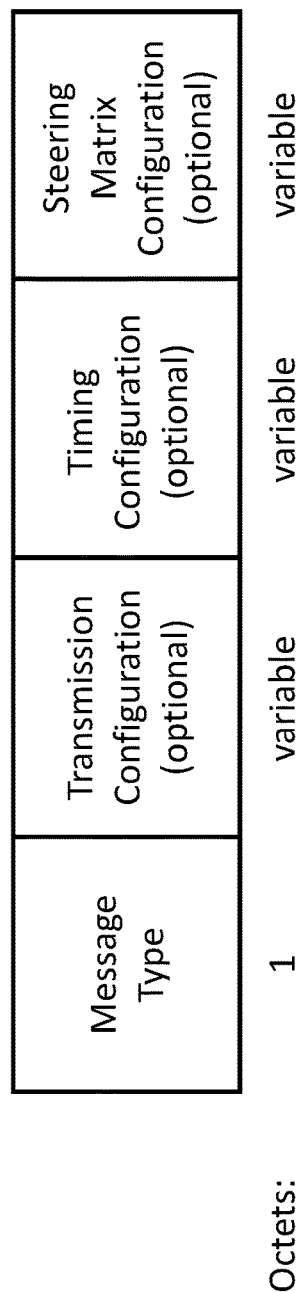
FIG. 9 illustrates a management frame carrying a sensing transmission, according to some embodiments.

As described above, some embodiments of the present disclosure define five sensing message types for Wi-Fi sensing, namely, sensing configuration message, sensing configuration response message, sensing trigger message, sensing response message, sensing response announcement, and sensing response NDP. In an example, except for the sensing response NDP, the remaining sensing messages types are carried in management frame as described in IEEE P802.11-REVmd/D5.0, § 9.6.7. In some examples, except for the sensing response NDP, the remaining sensing message types are carried in a new extension to an IEEE 802.11 control frame. In some examples, a combination of management and control frames may be used to realize these sensing messages types. In an implementation, the information content of all sensing message types except for sensing response NDP may be carried in a Public Action IEEE 802.11 management frame carrying the sensing transmissions as shown in FIG. 9. In some examples, timing configuration, transmission configuration, and steering matrix configuration as described in FIG. 9 are implemented as IEEE 802.11 elements (IEEE P802.11-REVmd/D5.0, § 9.4.2). In another implementation, the information content of all sensing message types except for sensing response NDP may be carried in a Protected Action IEEE 802.11 management frame carrying the sensing transmissions is shown in FIG. 9.

In one or more embodiments, the sensing message types may be identified by the message type field and each sensing message type may or may not carry the other identified elements, according to some embodiments. Examples of sensing message types and configuration elements are provided in Table 1.

TABLE 1

Sensing message types and configuration elements

| Value | Message Type | Message Direction | Transmission Configuration | Timing Configuration | Steering Matrix Configuration |
|---|---|---|---|---|---|
| 0 | Sensing configuration message | Sensing device to remote device | Optional Option 1: Specifies requested transmission configuration to be used by remote device for the measurement campaign or for a single sensing transmission in the case where a requested transmission configuration is not provided in a sensing trigger message. Option 2: If this element is absent in sensing configuration message, then remote device may treat this message as a remote device transmission capability query. | N/A | Optional Option 1: Specifies a set of steering matrix configurations that make up a look-up table and can be requested for a sensing transmission via an index in a sensing trigger message. Option 2: Specifies a default steering matrix configuration to use if none is specified in a sensing trigger message. If this field is absent, then remote device treats this message as a remote device transmission capability query. |
| 1 | Sensing configuration response | Remote device to sensing device | Option 1: If this element is absent in the sensing configuration message, remote device replies with delivered transmission configuration. Option 2: If this element is present in the sensing configuration message, remote device sends the delivered transmission configuration and configures itself according to the delivered transmission configuration. | N/A | If this element is absent in the sensing configuration message, remote device may respond with its antenna configuration (e.g., number of transmit/receive chains, number of antennas, digital/analog beamforming capabilities, etc.) |
| 2 | Sensing trigger message | Sensing device to remote device | Optional Option 1: If this element is absent then remote device may use preconfigured required transmission configuration | Optional Option 1: If this element is present, it specifies the periodicity of a measurement campaign and this sensing trigger | Optional Option 1: If this element is absent, then remote device transmits the one or more sensing transmissions specified by the sensing trigger |

TABLE 1-continued

Sensing message types and configuration elements

| Value | Message Type | Message Direction | Transmission Configuration | Timing Configuration | Steering Matrix Configuration |
|---|---|---|---|---|---|
| | | | values from the sensing configuration message. Option 2: If this element is present in the sensing trigger message, remote device applies the required transmission configuration from this element. | message initiates the first sensing transmission of the measurement campaign. Option 2: If this element is absent, then the sensing trigger message initiates a single sensing transmission. | message using the preconfigured default steering matrix configuration. Option 2: If this element is present, the element specifies a steering matrix to use for remote device sensing transmission, or a series of steering matrix configurations to use for sensing transmissions of a measurement campaign. The steering matrix configuration(s) can be specified using indices into a preconfigured steering matrix configuration table, or specific beamforming weights for each transmit path or transmitting antenna of remote device may be specified. |
| 4 | Sensing response message | Remote device to sensing device | Optional Option 1: Transmission parameters of this transmission (delivered transmission configuration) Option 2: A single bit flag if remote device applies the requested transmission configuration. Option 3: If this element is absent then remote device applies the requested transmission parameters | N/A | Optional Option 1: Steering matrix configuration applied to this transmission. Option 2: Index into a preconfigured steering matrix configuration table indicating the steering matrix configuration applied to this transmission. Option 3: If this element is absent then remote device applies the requested steering matrix configuration |
| 5 | Sensing response announcement | Remote device to sensing device | Optional Option 1: Transmission parameters of the following sensing response NDP transmission (delivered transmission configuration) Option 2: A single bit flag | N/A | Optional Option 1: Steering matrix configuration applied to the following sensing response NDP transmission. Option 2: Index into a preconfigured steering matrix |

TABLE 1-continued

Sensing message types and configuration elements

| Value | Message Type | Message Direction | Transmission Configuration | Timing Configuration | Steering Matrix Configuration |
|---|---|---|---|---|---|
| | | | if remote device applies the requested transmission configuration. Option 3: If this element is absent then remote device applies the requested transmission parameters | | configuration indicating the steering matrix configuration applied to the following sensing response NDP transmission. Option 3: If this element is absent then remote device applies the requested steering matrix configuration to the following sensing response NDP transmission |
| 6 to 255 | Reserved | N/A | N/A | N/A | N/A |

Exemplary transmission configuration elements (for example, required transmission configuration or delivered transmission configuration) for a sensing transmission are provided in Table 2.

TABLE 2

Transmission Configuration Element Details

| Name | Type | Valid Range | Description |
|---|---|---|---|
| SensingFrequencyBand | A set of frequency band values or identifiers | As defined in TABLE 3 (SensingFrequencyBand details) | Specifies the band in which sensing device is to take the sensing measurement |
| SensingBandwidth | A set of bandwidth values or identifiers | As defined in TABLE 4 (SensingBandwidth details) | Specifies the bandwidth in which sensing device is to take the sensing measurement. Note that this is included to allow a bandwidth to be specified if the channel identifier is not sufficient on its own (e.g., the 2.4-GHz band). If the channel identifier also defines the bandwidth then this may be set to 0 |
| SensingChannel | Integer | 1 . . . 511 | Channel identifier |
| SensingTrainingField | A set of training field values | As defined in TABLE 5 (SensingTrainingField details) | Identifies the training field which is to be used for the sensing measurement |
| SensingSpatialConf-Index | Integer | 0 . . . 15 | Index into a table of steering matrix configurations, such as may be preconfigured for remote device via a sensing configuration message and optionally acknowledged by a sensing configuration response message. 0 may be reserved to indicate no configuration requirement (e.g., the remote device may use a default spatial matrix configuration) and 15 |

TABLE 2-continued

Transmission Configuration Element Details

| Name | Type | Valid Range | Description |
|---|---|---|---|
| | | | may be reserved to indicate for remote device to apply the spatial matrix configuration specified by the SensingSpatialConfIndex |
| SensingSpatialConfSteeringMatrix | A set of spatial steering vector values, for example a phase and gain value, or a real (I) and imaginary (Q) value, each representing a spatial matrix configuration | As defined in TABLE 6 (SensingSpatialConfSteeringMatrix details) | A series of steering vectors values (i.e., spatial matrix configurations) which are applied to each of the implemented antennas on remote device prior to the sending of a sensing transmission |

TABLE 3

SensingFrequencyBand details

| Value | Meaning |
|---|---|
| 0 | Reserved |
| 1 | 2.4 GHz |
| 2 | 5 GHz |
| 3 | 6 GHz |
| 4 | 60 GHz |
| 5 . . . 15 | Reserved |

TABLE 4

SensingBandwidth details

| Value | Meaning |
|---|---|
| 0 | Defined by channel identifier |
| 1 | 20 MHz |
| 2 | 40 MHz |
| 3 | 80 MHz |
| 4 | 80 + 80 MHz |

TABLE 4-continued

SensingBandwidth details

| Value | Meaning |
|---|---|
| 5 | 160 MHz |
| 6 . . . 15 | Reserved |

TABLE 5

SensingTrainingField details

| Value | Meaning |
|---|---|
| 0 | Reserved |
| 1 | Legacy Long Training Field (L-LTF) |
| 2 | High Throughput Long Training Field (HT-LTF) |
| 3 | Very High Throughput Long Training Field (VHT-LTF) |
| 4 | High Efficiency Long Training Field (HE-LTF) |
| 5 | Extremely High Throughput Long Traiming Field (EHT-LTF) |
| 6 . . . 15 | Reserved |

TABLE 6

SensingSpatialConfSteeringMatrix details

| Name | Type | Valid Range | Description |
|---|---|---|---|
| TransmissionAntennaCount | Integer | 1 . . . 8 | Number of transmission antennas on the remote device used for sensing transmissions. Defines the number of SensingAntennaNSteeringVectorRe and Sensing AntennaNSteeringVectorIm pairs that follow in the element. At least one antenna must be specified |
| SensingAntenna0-SteeringVectorRe | Half-precision float (16 bits) | | Real part of the steering vector for antenna 0 |

TABLE 6-continued

SensingSpatialConfSteeringMatrix details

| Name | Type | Valid Range | Description |
|---|---|---|---|
| SensingAntenna0-SteeringVectorIm | Half-precision float (16 bits) | | Imaginary part of the steering vector for antenna 0 |
| . | . | | . |
| . | . | | . |
| . | . | | . |
| SensingAntenna7-SteeringVectorRe | Half-precision float (16 bits) | | Real part of the steering vector for antenna 7 |
| SensingAntenna7-SteeringVectorIm | Half-precision float (16 bits) | | Imaginary part of the steering vector for antenna 7 |

In an example, the data provided in TABLE 2 to TABLE 6 may be encoded into an Element as described in IEEE P802.11-REVmd/D5.0 § 9.4.2 for inclusion in sensing messages between sensing device 502 and remote device 504-1, or vice versa. In a measurement campaign involving multiple remote devices, these transmission configuration elements may be defined for all remote devices (i.e., per remote device). In an example, when transmitted from sensing device 502 to remote device 504-1, these transmission configuration elements may configure a remote device sensing transmission and when transmitted from remote device 504-1 to sensing device 502, then these transmission configuration elements report the configuration used by remote device 504-1 for a sensing transmission.

Examples of parameters defined as a part of a measurement campaign for periodic or semi-periodic sensing transmissions, for example, from remote device 504-1 to sensing device 502 are provided in TABLE 7.

TABLE 7

Timing Configuration Elements

| Name | Type | Valid Range | Description |
|---|---|---|---|
| SensingMeasType | A set of sensing measurement type values | As defined in TABLE 8 (SensingMeasType details) | Specifies the type of periodic transmission required to compute the sensing measurement |
| TimeBetweenFrames | Integer | 0 . . . 255 | Specifies the time between sensing transmissions from remote device to sensing device in units of 100 ms. Ignored in the case of single sensing transmission |
| NumberSensingMeas | Integer | 0 . . . 65535 | Number of sensing transmissions made in a multi-transmission measurement campaign. Ignored in case of a single sensing transmission |

TABLE 8

SensingMeasType details

| Value | Meaning |
|---|---|
| 0 | Reserved |
| 1 | Single |
| 2 | Multi |
| 3 | Periodic |
| 4 | None |
| 5 . . . 15 | Reserved |

In an example, the parameters defined in TABLE 7 and TABLE 8 are encoded into an Element, for example according to IEEE P802.11-REVmd/D5.0 for inclusion in the sensing messages between sensing device 502 and remote device 504-1. According to an implementation, for a measurement campaign involving multiple remote devices, these parameters may be defined for all remote devices.

In some examples, a time-of-first sensing transmission may be specified in a timing configuration element. An example of a suitable, common time reference is the timing synchronization function (TSF). In this example, a value for TSF representing a time in the future may be specified as part of the requested timing configuration, and the first sensing transmission made by remote device 504-1 is delivered by scheduler 538-1 at the specified time. In an example, a resolution of the TSF may be reduced to reduce the number of bits of data that must be transferred to specify the time-of-first sensing transmission.

In an implementation, the SensingMeasType periodic configuration may use the same methodology as the fine timing measurement disclosed in IEEE P802.11-REVmd/D5.0, § 9.4.2.167. Some of timing configuration parameters for the periodic SensingMeasType are provided in TABLE 9, according to an embodiment.

TABLE 9

Periodic SensingMeasType timing configuration parameters

| Field Identifier | Value(s) | Description |
|---|---|---|
| Number of Bursts - Exponent | 0 . . . 15 | Exponent, n, where the number of bursts is $2^n$ and n = 15 is an initiator value. i.e., between 1 and 16.3k bursts are supported |
| Burst Duration | 0 . . . 15 | Look-up table for values between 250 μs and 128 ms (includes a "no preference" indicator) |
| Time Between Frames | 0 . . . 255 | Time between measurement frames in units of 100 ms (includes a "no preference" indicator) |
| Partial TSF Timer | 0 . . . $2^{16}$-1 | Used for internal synchronization. Bits B10 . . . B25 of the TSF field |
| Measurements Per Burst | 0 . . . 31 | Requested measurements per burst (includes a "no preference" indicator) |
| Burst Period | 0 . . . $2^{16}$-1 | Interval between two bursts in units of 100 ms (includes a "no preference" indicator) |

In an example, the timing configuration parameters are encoded into an Element as described in IEEE P802.11-REVmd/D5.0, § 9.4.2 for inclusion in the messages between sensing device 502 and remote device 504-1. The periodic measurement configuration field is illustrated in FIG. 10A and FIG. 10B according to an example implementation. Burst duration subfield of the periodic measurement configuration field for IEEE P802.11-REVmd/D5.0, § 9.4.2 is provided in TABLE 10 according to some embodiments.

TABLE 10

Burst Duration subfield

| Value | Represents |
|---|---|
| 0 . . . 1 | Reserved |
| 2 | 250 μs |
| 3 | 500 μs |
| 4 | 1 ms |
| 5 | 2 ms |
| 6 | 4 ms |
| 7 | 8 ms |
| 8 | 16 ms |
| 9 | 32 ms |
| 10 | 64 ms |
| 11 | 128 ms |
| 12 . . . 14 | Reserved |
| 15 | No preference |

According some implementations, the steering vector configuration element for a lookup table of steering matrix configurations are described in Table 11.

TABLE 11

SteeringVector Configuration Element details

| Name | Type | Valid Range | Description |
|---|---|---|---|
| LookupEntriesCount | Integer | 1 . . . 14 | Number of entries in the lookup table specified by this Element. Defines the number of EntryM . . . sets of data that follow in the element. At least one entry must be specified. |
| TransmissionAntennaCount | Integer | 1 . . . 8 | Number of transmission antennas on the remote device used for sensing transmissions. Defines the number of SensingAntennaNSteeringVectorRe and SensingAntennaNSteeringVectorIm pairs that follow in the element. At least one antenna must be specified. |
| Entry1SensingAntenna0-SteeringVectorRe | Half-precision float (16 bits) | | Real part of the steering vector for antenna 0 in lookup table entry 1 |
| Entry1SensingAntenna0-SteeringVectorIm | Half-precision float (16 bits) | | Imaginary part of the steering vector for antenna 0 in lookup table entry 1 |
| . | . | | . |
| . | . | | . |
| . | . | | . |
| Entry1SensingAntenna7-SteeringVectorRe | Half-precision float (16 bits) | | Real part of the steering vector for antenna 7 in lookup table entry 1 |

TABLE 11-continued

SteeringVector Configuration Element details

| Name | Type | Valid Range | Description |
|---|---|---|---|
| Entry1SensingAntenna7-SteeringVectorIm | Half-precision float (16 bits) | | Imaginary part of the steering vector for antenna 7 in lookup table entry 1 |
| . | . | | . |
| . | . | | . |
| . | . | | . |
| Entry14SensingAntenna0-SteeringVectorRe | Half-precision float (16 bits) | | Real part of the steering vector for antenna 0 in lookup table entry 14 |
| Entry14SensingAntenna0-SteeringVectorIm | Half-precision float (16 bits) | | Imaginary part of the steering vector for antenna 0 in lookup table entry 14 |
| . | . | | . |
| . | . | | . |
| . | . | | . |
| Entry14SensingAntenna7-SteeringVectorRe | Half-precision float (16 bits) | | Real part of the steering vector for antenna 7 in lookup table entry 14 |
| Entry14SensingAntenna7-SteeringVectorIm | Half-precision float (16 bits) | | Imaginary part of the steering vector for antenna 7 in lookup table entry 14 |

In an example, the data provided in TABLE 11 may be encoded into an Element as IEEE P802.11-REVmd/D5.0, § 9.4.2 for inclusion in the messages between sensing device 502 and remote device 504-1. In a measurement campaign involving multiple remote devices, these parameters may be defined for all devices. When transmitted from sensing device 502 to remote device 504-1 then the steering matrix configurations populate a lookup table (which can later be accessed via an index).

Figure 11:
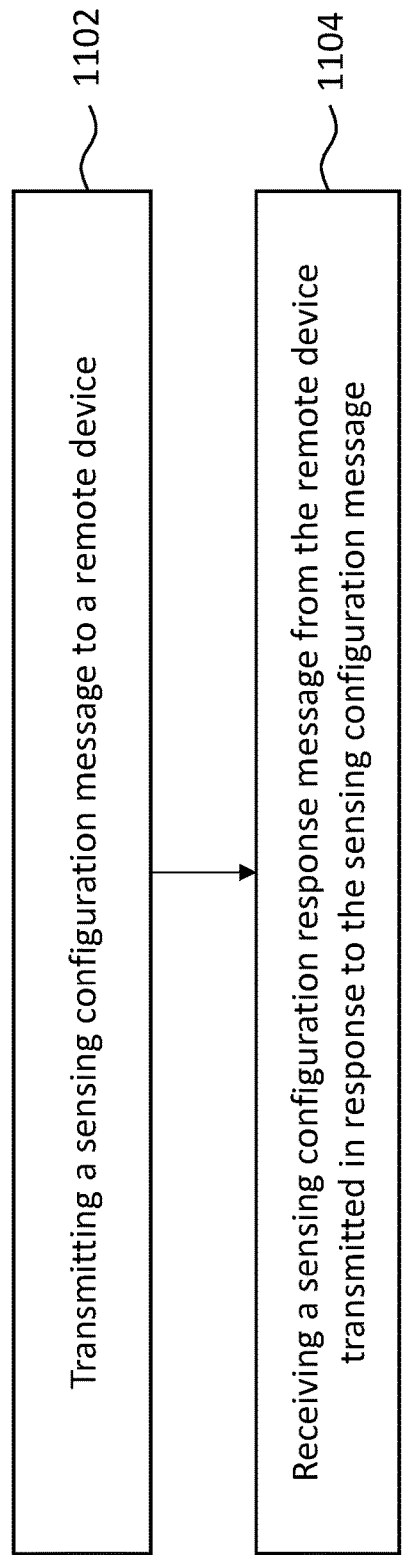
FIG. 11 depicts a flowchart for configuring a remote device for a measurement campaign, according to some embodiments.

FIG. 11 depicts flowchart 1100 for configuring remote device 504-1 for a measurement campaign, according to some embodiments.

Step 1102 includes transmitting a sensing configuration message to remote device 504-1. In some implementations, remote device 504-1 may be unknown to sensing device 502 and sensing device 502 may be required to determine transmission capability of remote device 504-1 in order to configure sensing transmissions from remote device 504-1 to sensing device 502 based on the transmission capability, for example for the measurement campaign. Accordingly, sensing device 502 may send the sensing configuration message to remote device 504-1 to determine transmission capability of remote device 504-1. In an implementation, the sensing configuration message may include data elements. In some implementations, the sensing configuration message may not include any data elements.

Step 1104 includes receiving a sensing configuration response message from remote device 504-1 transmitted in response to the sensing configuration message. In an example, the sensing configuration response message may include the requested transmission capability. In an implementation, sensing device 502 may receive the sensing configuration response message and configure remote device 504-1 for the measurement campaign based on the requested transmission capability that sensing device 502 knows that remote device 504-1 is capable of implementing.

Figure 12:
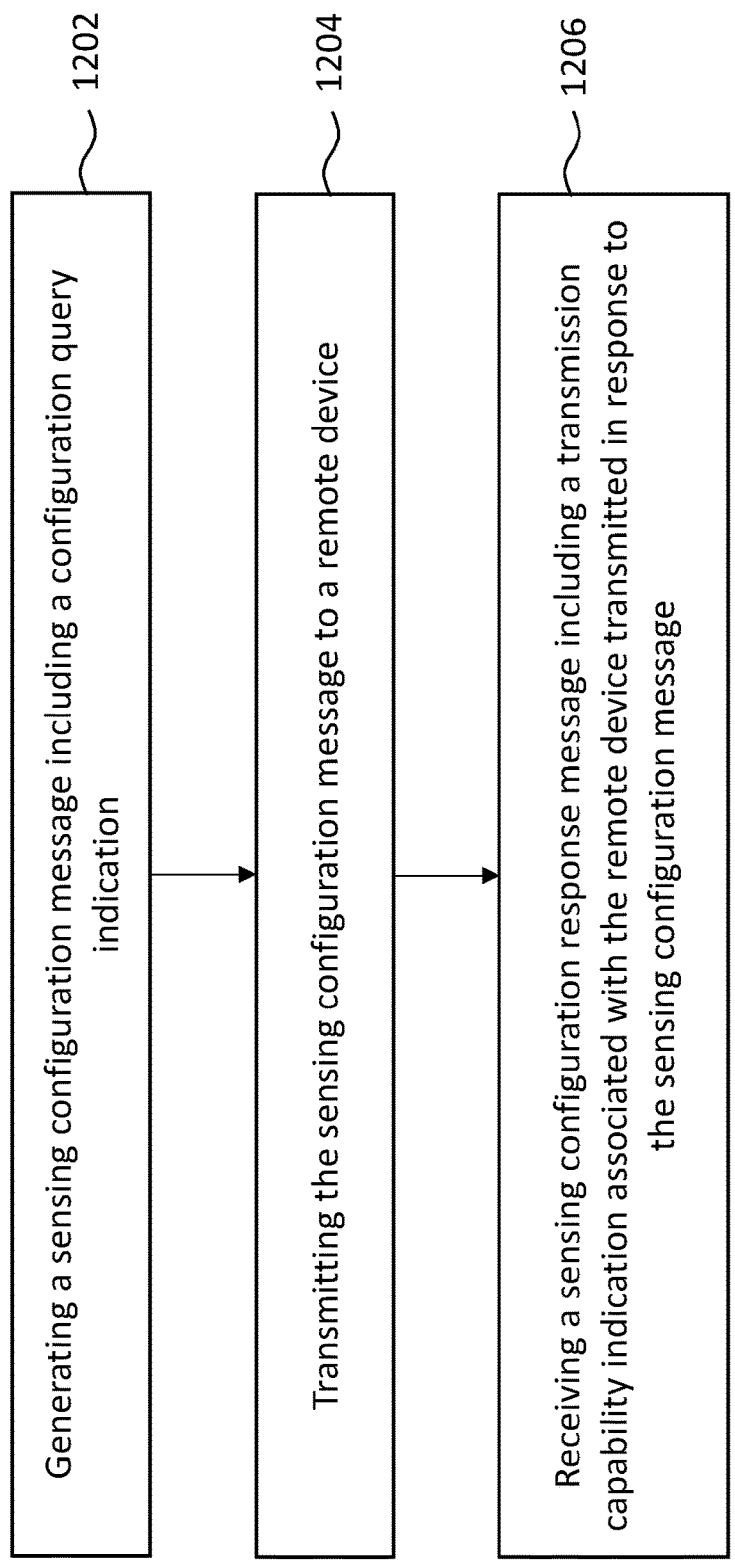
FIG. 12 depicts a flowchart for querying the remote device to determine remote device capabilities, according to some embodiments.

FIG. 12 depicts flowchart 1200 for querying remote device 504-1 to determine remote device capabilities, according to some embodiments.

Step 1202 includes generating a sensing configuration message including a configuration query indication. In an example, the configuration query indication may refer to an indication that sensing device 502 is requesting remote device 504-1 to send its transmission capability.

Step 1204 includes transmitting the sensing configuration message to remote device 504-1. In an implementation, sensing device 502 may send the sensing configuration message to remote device 504-1. In an implementation, sensing device 502 may send the sensing configuration message to remote device 504-1 for the purpose of querying transmission capability of remote device 504-1.

Step 1206 includes receiving a sensing configuration response message including a transmission capability indication associated with remote device 504-1 transmitted in response to the sensing configuration message. In an example, the transmission capability indication may include the transmission capability of remote device 504-1. In an implementation, sensing device 502 may receive the sensing configuration response message from remote device 504-1.

Figure 13:
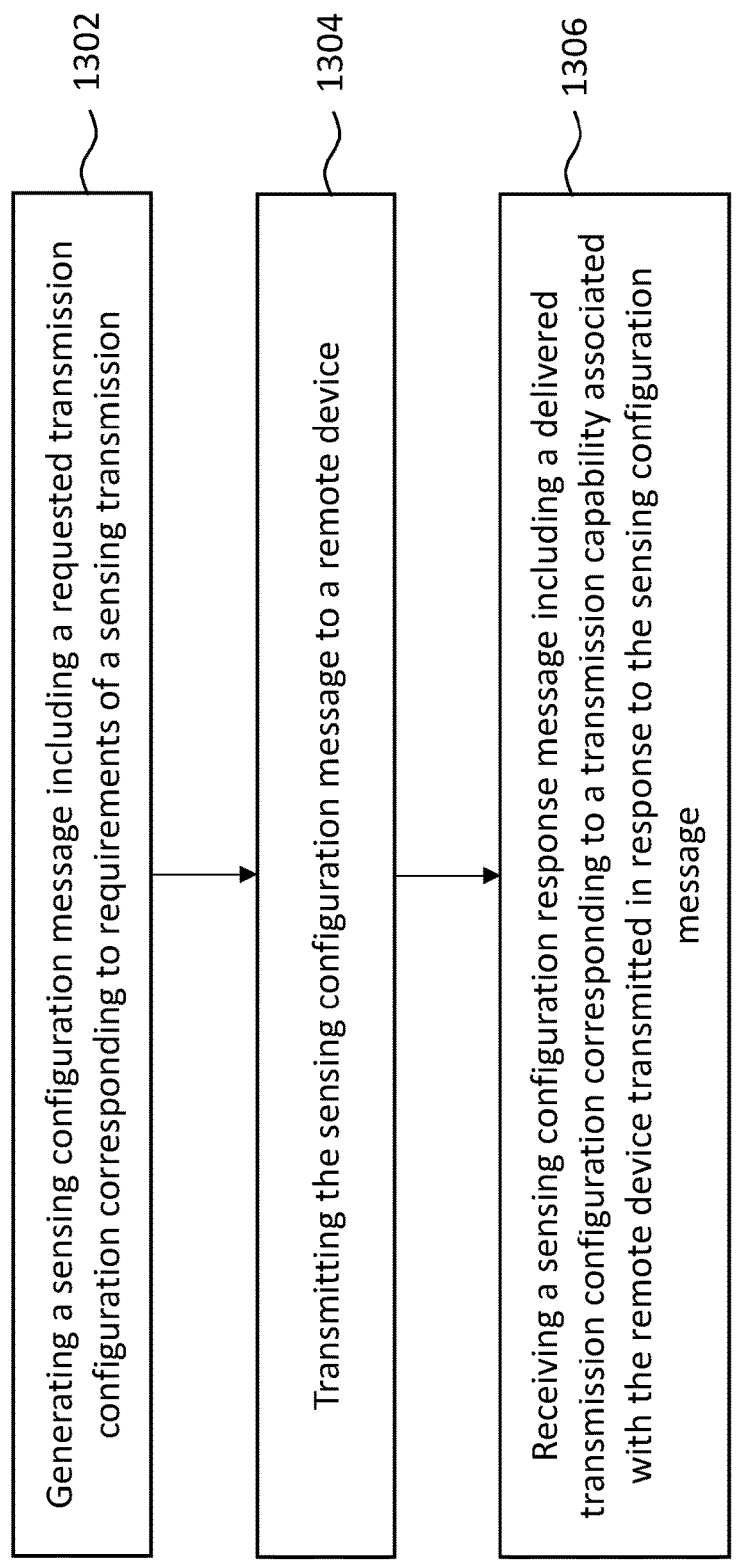
FIG. 13 depicts a flowchart for querying the remote device to determine remote device capabilities, according to some embodiments.

FIG. 13 depicts flowchart 1300 for querying remote device 504-1 to determine remote device capabilities, according to some embodiments.

Step 1302 includes generating a sensing configuration message including a requested transmission configuration corresponding to requirements of a sensing transmission. In an implementation, sensing device 502 may generate the sensing configuration message including the requested transmission configuration.

Step 1304 includes transmitting the sensing configuration message to remote device 504-1. In an implementation, sensing device 502 may transmit the sensing configuration message to remote device 504-1.

Step 1306 receiving a sensing configuration response message including a delivered transmission configuration corresponding to a transmission capability associated with remote device 504-1 transmitted in response to the sensing configuration message. In an implementation, sensing device 502 may receive the sensing configuration response message including the delivered transmission configuration from remote device 504-1 transmitted in response to the sensing configuration message.

Figure 14:
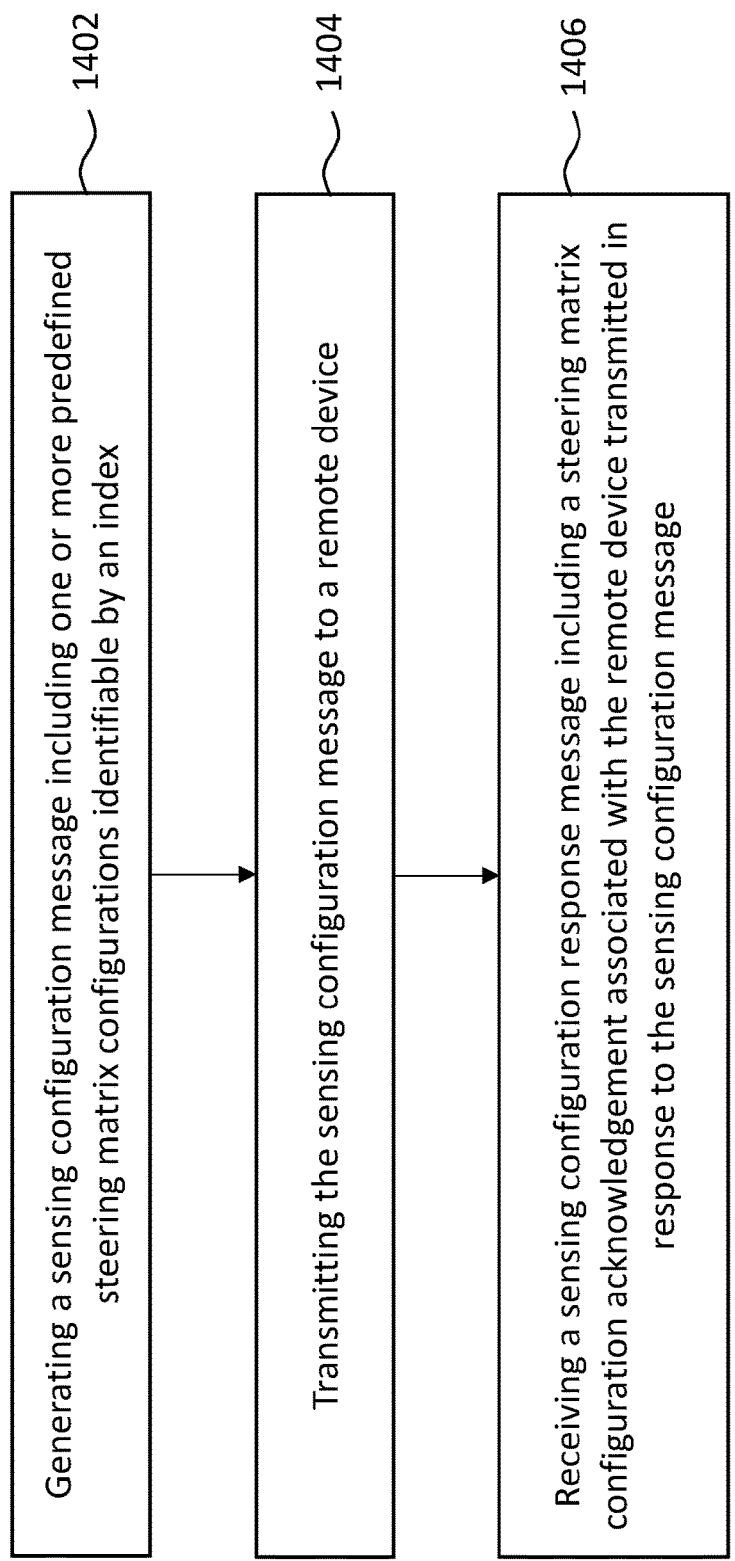
FIG. 14 depicts a flowchart for configuring transmission capability for a measurement campaign, according to some embodiments.

FIG. 14 depicts flowchart 1400 for configuring transmission capability for a measurement campaign, according to some embodiments.

Step 1402 includes generating a sensing configuration message including one or more predefined steering matrix configurations identifiable by an index. According to an implementation, sensing device 502 may generate the sensing configuration message.

Step 1404 includes transmitting the sensing configuration message to remote device. 504-1. In an implementation, sensing device 502 may transmit the sensing configuration message including the one or more predefined steering matrix configurations to remote device 504-1.

Step 1406 includes receiving a sensing configuration response message including a steering matrix configuration acknowledgement associated with remote device 504-1 transmitted in response to the sensing configuration message. According to an implementation, sensing device 502 may receive the sensing configuration response message including the steering matrix configuration acknowledgement from remote device 504-1 in response to the sensing configuration message.

Figure 15:
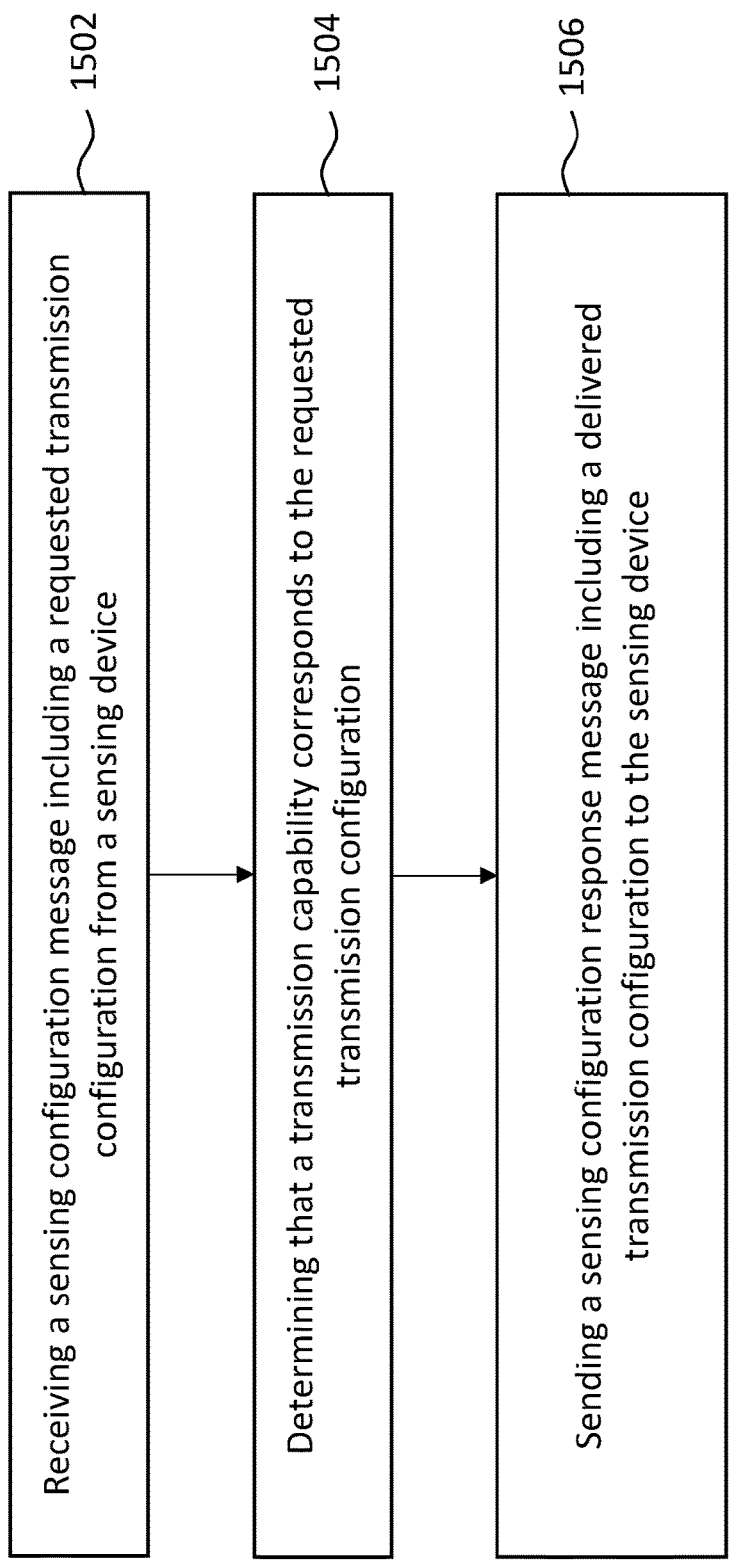
FIG. 15 depicts a flowchart for transmitting a sensing configuration response message including a delivered transmission configuration, according to some embodiments.

FIG. 15 depicts flowchart 1500 for transmitting a sensing configuration response message including a delivered transmission configuration, according to some embodiments.

Step 1502 includes receiving a sensing configuration message including a requested transmission configuration from sensing device 502. In some implementations, remote device 504-1 may receive the sensing configuration message including the requested transmission configuration from sensing device 502.

Step 1504 includes determining that a transmission capability corresponds to the requested transmission configuration. According to some implementations, in response to receiving the sensing configuration message including the requested transmission configuration, remote device 504-1 may determine that its transmission capability corresponds to the requested transmission configuration.

Step 1506 includes sending a sensing configuration response message including a delivered transmission configuration to sensing device 502. In some implementations, remote device 504-1 may send the sensing configuration response message including the delivered transmission configuration to sensing device 502.

Figure 16:
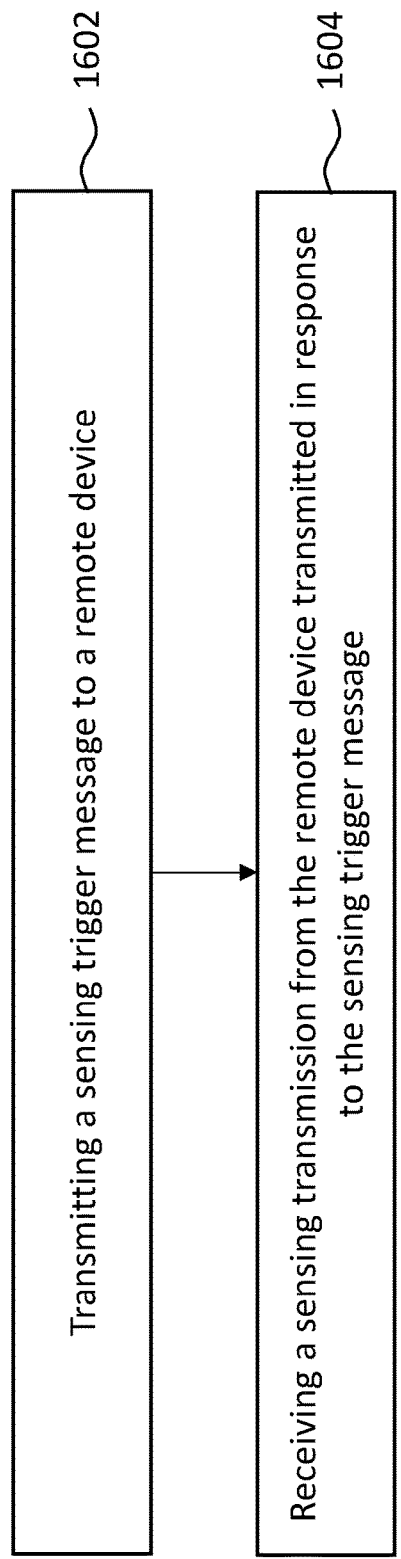
FIG. 16 depicts a flowchart for initiating a sensing transmission with the remote device, according to some embodiments.

FIG. 16 depicts flowchart 1600 for initiating a sensing transmission with remote device 504-1, according to some embodiments.

Step 1602 includes transmitting a sensing trigger message to remote device 504-1. In an implementation, sensing device 502 may initiate a sensing transmission with transmission parameters that sensing device 502 requires remote device 504-1 to use.

Step 1604 includes receiving a sensing transmission from remote device 504-1 transmitted in response to the sensing trigger message.

Figure 17:
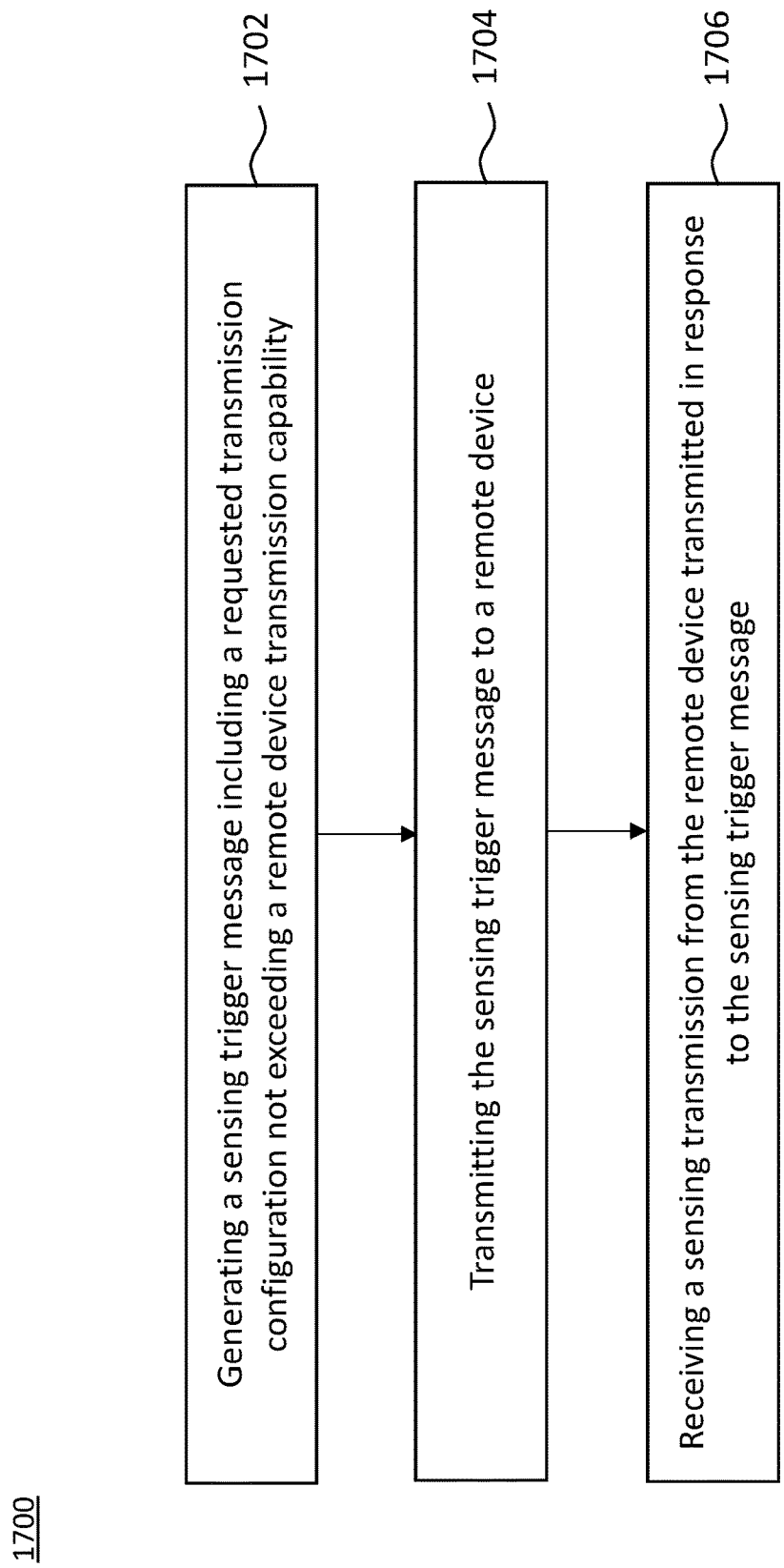
FIG. 17 depicts a flowchart for receiving a sensing transmission in response to a sensing trigger message, according to some embodiments.

FIG. 17 depicts flowchart 1700 for receiving a sensing transmission in response to a sensing trigger message, according to some embodiments.

Step 1702 includes generating a sensing trigger message including a requested transmission configuration not exceeding a remote device transmission capability. In an implementation, sensing device 502 may generate the sensing trigger message including the requested transmission configuration not exceeding the remote device transmission capability. In an example, remote device transmission capability may be understood as transmission parameters supported by remote device 504-1.

Step 1704 includes transmitting the sensing trigger message to remote device 504-1. In an implementation, sensing device 502 may transmit the sensing trigger message to remote device 504-1.

Step 1706 includes receiving a sensing transmission from remote device 504-1 transmitted in response to the sensing trigger message. In an implementation, sensing device 502 may receive the sensing transmission transmitted by remote device 504-1 in response to the sensing trigger message.

Figure 18:
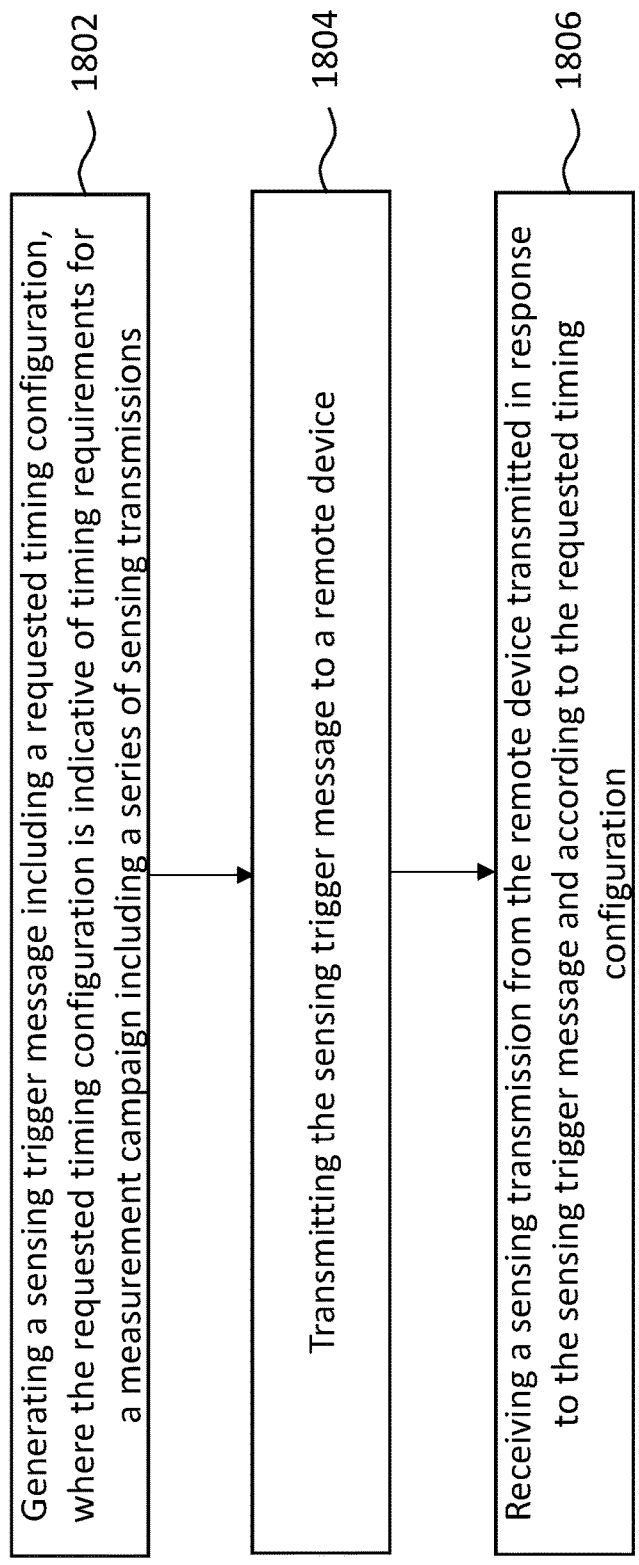
FIG. 18 depicts a flowchart for receiving a sensing transmission in response to a sensing trigger message, according to some embodiments.

FIG. 18 depicts flowchart 1800 for receiving a sensing transmission in response to a sensing trigger message, according to some embodiments.

Step 1802 includes generating a sensing trigger message including a requested timing configuration. In an example, the requested timing configuration may be indicative of timing requirements for a measurement campaign including a series of sensing transmissions. In an implementation, sensing device 502 may generate the sensing trigger message including the requested timing configuration.

Step 1804 includes transmitting the sensing trigger message to remote device 504-1. In an implementation, sensing device 502 may transmit the sensing trigger message to remote device 504-1.

Step 1806 includes receiving a sensing transmission from remote device 504-1 transmitted in response to the sensing trigger message and according to the requested timing configuration. In an example, the sensing transmission may include one of a sensing response message and a sensing response NDP. In an implementation, sensing device 502 may receive the sensing transmission from remote device 504-1 in response to the sensing trigger message.

Figure 19:
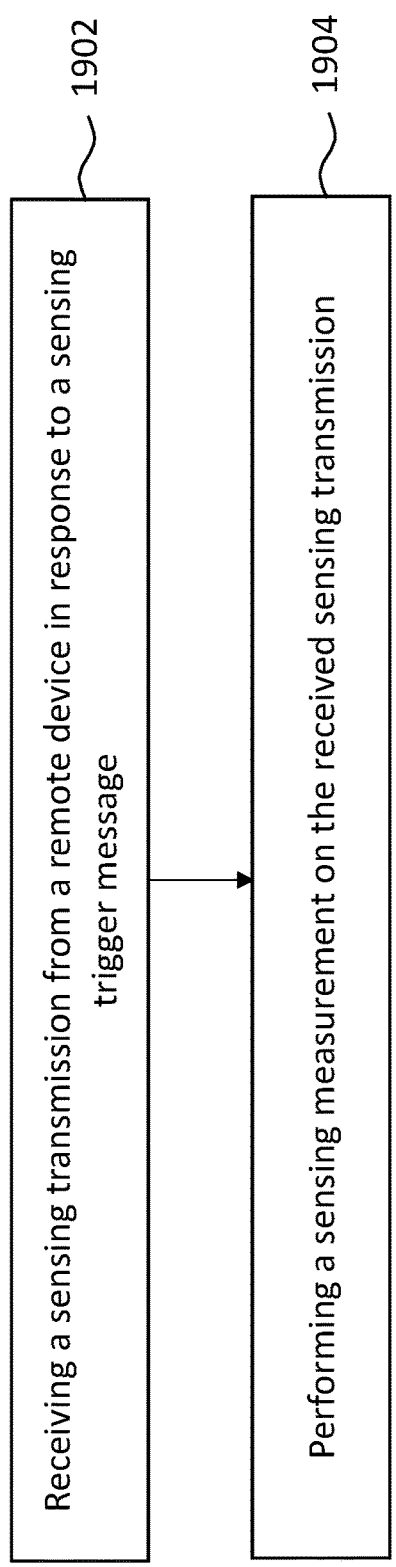
FIG. 19 depicts a flowchart for performing a sensing measurement on a received sensing transmission, according to some embodiments.

FIG. 19 depicts flowchart 1900 for performing a sensing measurement on a received sensing transmission, according to some embodiments.

Step 1902 includes receiving a sensing transmission from remote device 504-1 in response to a sensing trigger message. In an example, the sensing transmission may include a training field. In some examples, the sensing transmission may include delivered transmission configuration. According to an implementation, sensing device 502 may receive the sensing transmission from remote device 504-1 in response to the sensing trigger message.

Step 1904 includes performing a sensing measurement on the received sensing transmission. According to an implementation, sensing device 502 may perform the sensing measurement based on a training field of the received sensing transmission. In some implementations, sensing device 501 may identify the delivered transmission configuration of the sensing transmission and compute a sensing measurement according to the delivered transmission configuration and the sensing transmission. In some implementations, if sensing device 502 determines that the sensing transmission does not include a delivered transmission configuration, sensing device 502 may identify a default transmission configuration as the transmission configuration responsive to the determination.

Figure 20:
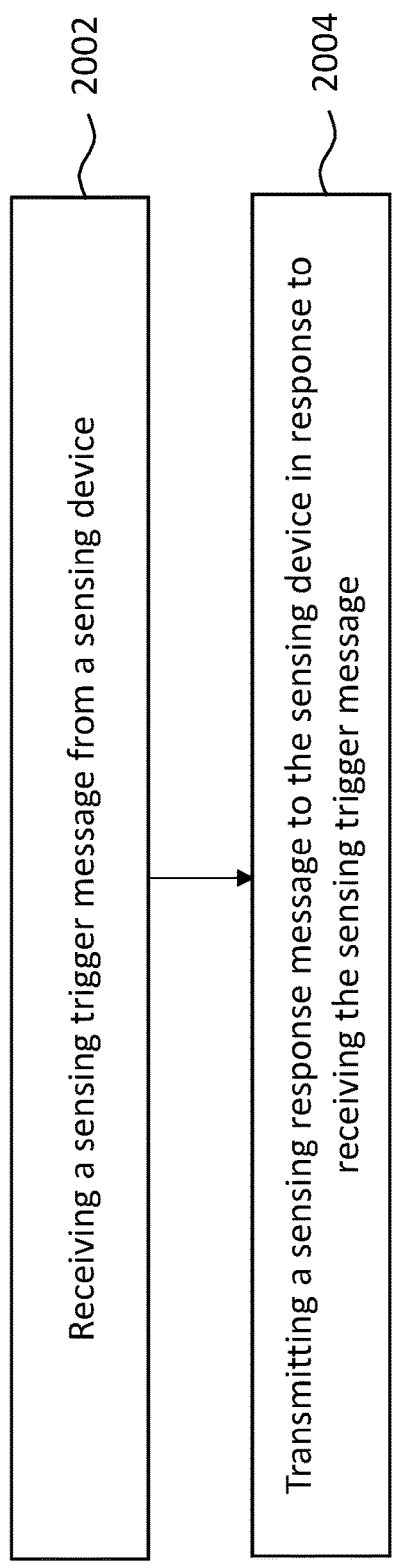
FIG. 20 depicts a flowchart for transmitting a sensing response message in response to receiving a sensing trigger message, according to some embodiments.

FIG. 20 depicts flowchart 2000 for transmitting a sensing response message in response to receiving a sensing trigger message, according to some embodiments.

Step 2002 includes receiving a sensing trigger message from sensing device 502. In an example, the sensing trigger message may include requested transmission configuration.

According to an implementation, remote device 504-1 may receive the sensing trigger message from sensing device 502.

Step 2004 includes transmitting a sensing response message to sensing device 502 in response to receiving the sensing trigger message. In an example, the sensing response message may include a delivered transmission configuration. In an implementation, remote device 504-1 may transmit the sensing response message to sensing device 502 in response to receiving the sensing trigger message. Further, according to an implementation, prior to transmitting the sensing response message, remote device 504-1 may apply remote device transmission parameters corresponding to the delivered transmission configuration.

Figure 21:
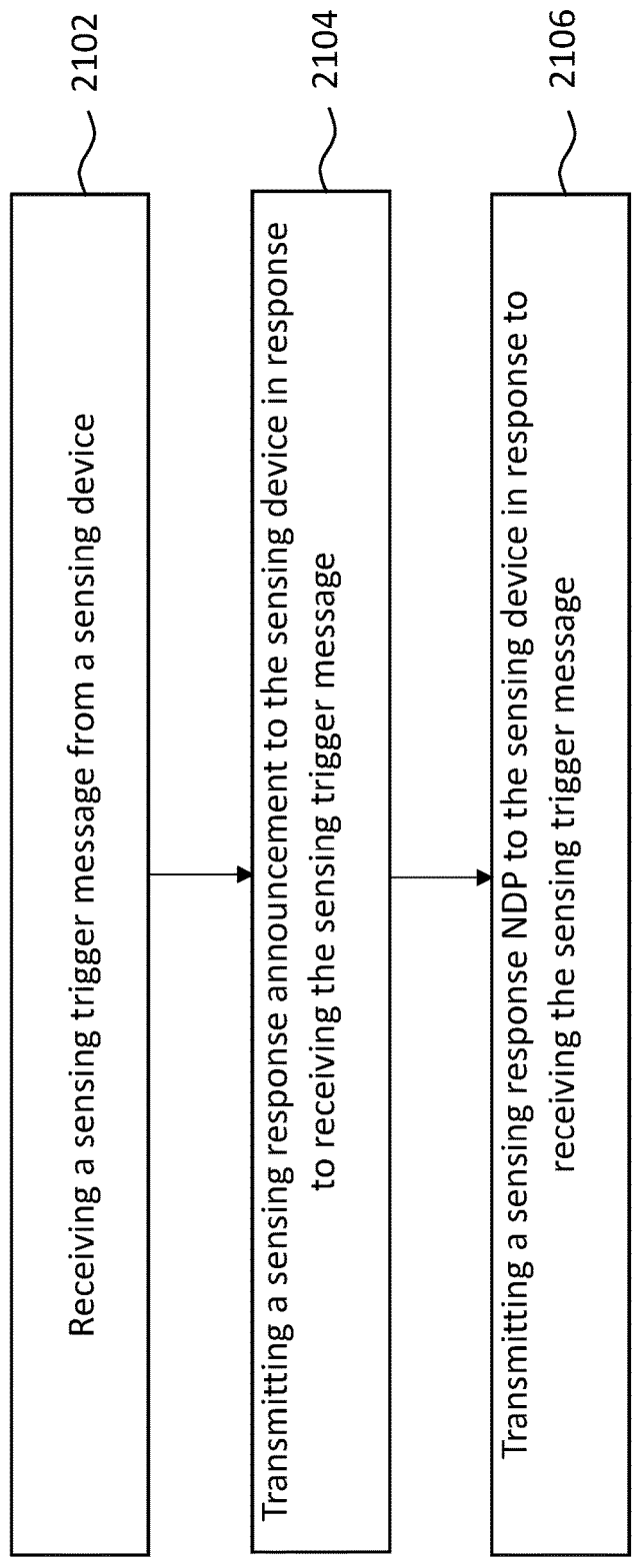
FIG. 21 depicts a flowchart for transmitting a sensing response announcement in response to receiving a sensing trigger message, according to some embodiments.

FIG. 21 depicts flowchart 2100 for transmitting a sensing response announcement in response to receiving a sensing trigger message, according to some embodiments.

Step 2102 includes receiving a sensing trigger message from sensing device. In an example, the sensing trigger message may include a requested transmission configuration. According to an implementation, remote device 504-1 may receive the sensing trigger message from sensing device 502.

Step 2104 includes transmitting a sensing response announcement to the sensing device in response to receiving the sensing trigger message. In an example, the sensing response announcement may include a delivered transmission configuration. In an implementation, remote device 504-1 may transmit the sensing response announcement to sensing device 502 in response to receiving the sensing trigger message.

Step 2106 includes transmitting a sensing response NDP to sensing device 502 in response to receiving the sensing trigger message. In an implementation, remote device 504-1 may transmit the sensing response NDP to sensing device 502 in response to receiving the sensing trigger message. According to an implementation, prior to the transmission of the sensing response NDP, remote device 504-1 may apply remote device transmission parameters corresponding to the delivered transmission configuration.

Figure 22:
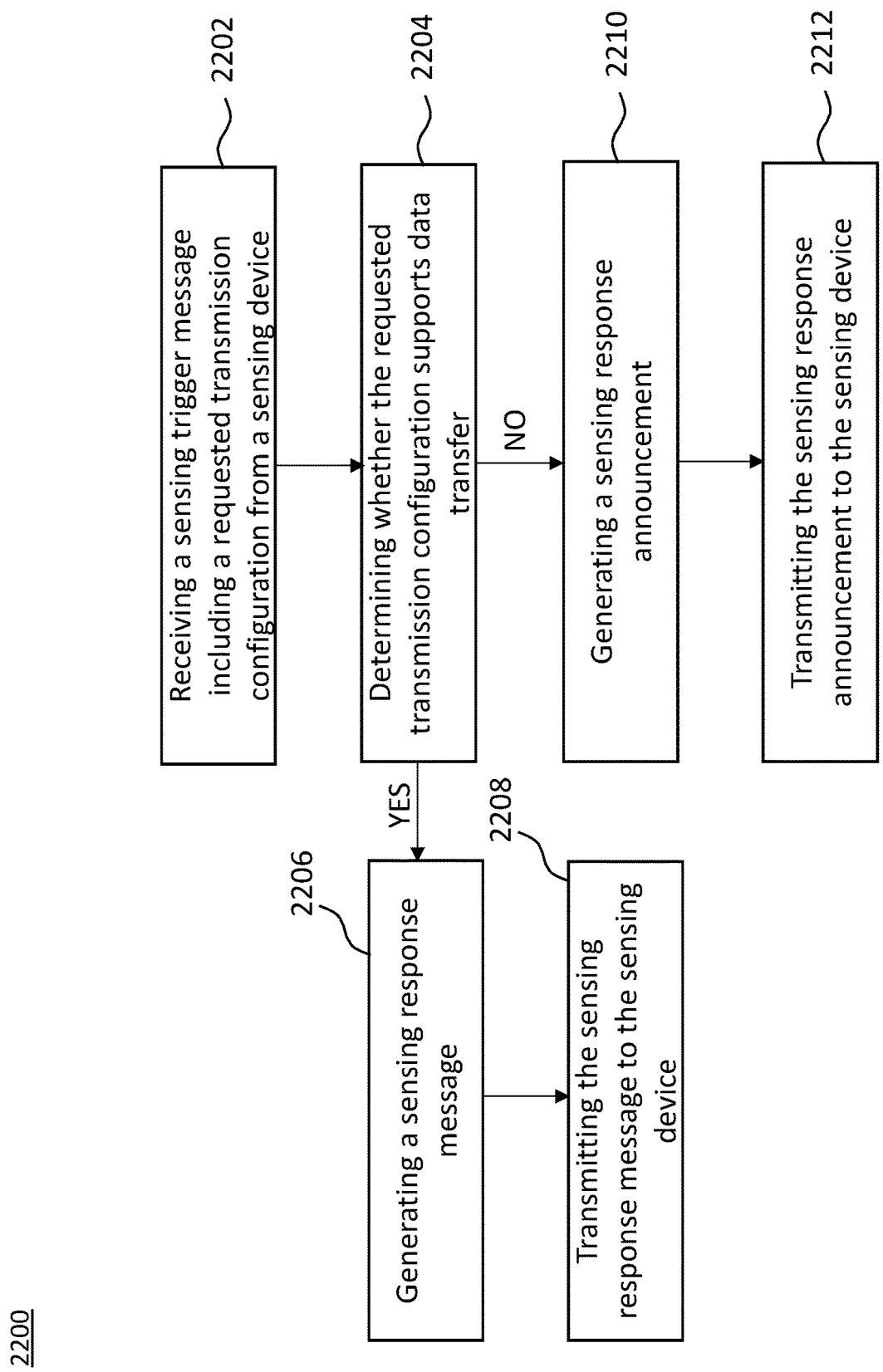
FIG. 22 depicts a flowchart for generating a sensing response message in response to receiving a sensing trigger message, according to some embodiments.

FIG. 22 depicts flowchart 2200 for generating a sensing response message in response to receiving a sensing trigger message, according to some embodiments.

Step 2202 includes receiving a sensing trigger message including a requested transmission configuration from sensing device 502. In an implementation, remote device 504-1 may receive the sensing trigger message including the requested transmission configuration from sensing device 502.

Step 2204 includes determining whether the requested transmission configuration supports data transfer. According to an implementation, remote device 504-1 may determine whether the requested transmission configuration supports data transfer. If it is determined that the requested transmission configuration supports data transfer, then flowchart 2200 proceeds to step 2206 'YES' branch, and if it is determined that the requested transmission configuration does not support data transfer, then flowchart 2200 proceeds to step 2210 'NO' branch.

Step 2206 includes generating a sensing response message. In an implementation, remote device 504-1 may generate the sensing response message when the requested transmission configuration supports data transfer. In an example, the sensing response message may include a delivered transmission configuration.

Step 2208 includes transmitting the sensing response message to the sensing device. According to an implementation, remote device 504-1 may transmit the sensing response message to sensing device 502.

Step 2210 includes generating a sensing response announcement. According to an implementation, remote device 504-1 may generate the sensing response announcement when the requested transmission configuration does not support data transfer. In an example, the sensing response announcement may include a delivered transmission configuration.

Step 2212 includes transmitting the sensing response announcement to sensing device 502 without applying the remote device transmission parameters corresponding to the delivered transmission configuration which does not support data transfer. In an implementation, remote device 504-1 may transmit the sensing response announcement to sensing device 502.

Figure 23:
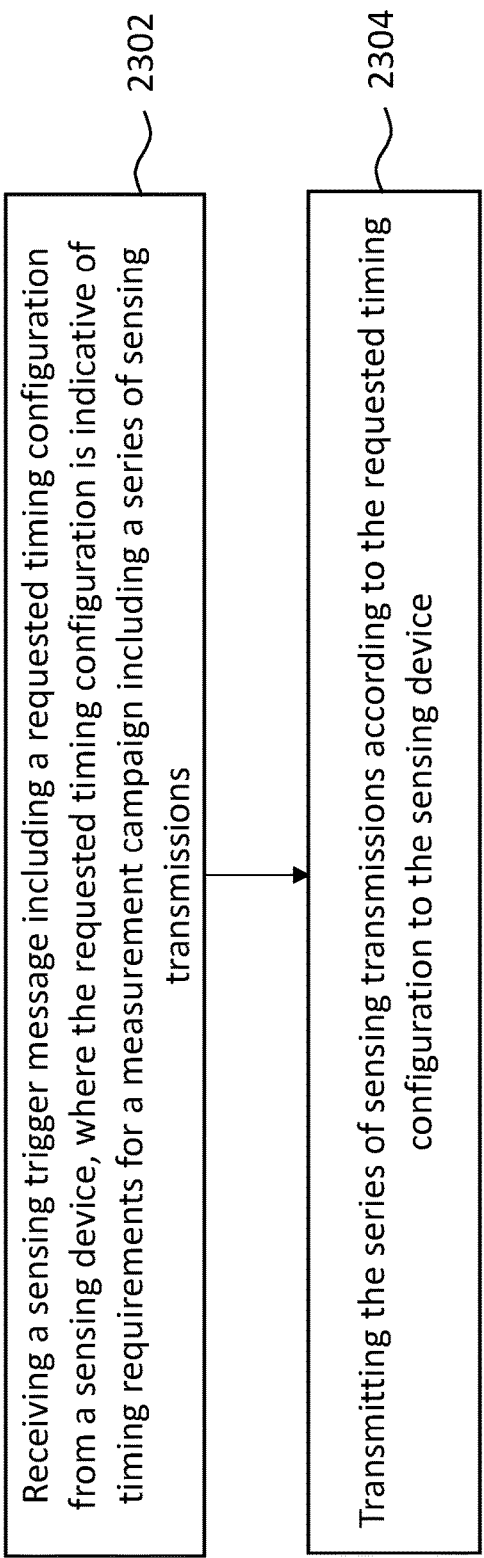
FIG. 23 depicts a flowchart for transmitting sensing transmissions in accordance to a requested timing configuration, according to some embodiments.

FIG. 23 depicts flowchart 2300 for transmitting sensing transmissions in accordance to a requested timing configuration, according to some embodiments.

Step 2302 includes receiving a sensing trigger message including a requested timing configuration from sensing device 502. In an example, the requested timing configuration may be indicative of timing requirements for a measurement campaign including a series of sensing transmissions. In an implementation, remote device 504-1 may receive the sensing trigger message from sensing device 502. In an example, the series of sensing transmissions configured according to requested timing configuration is periodic.

Step 2304 includes transmitting the series of sensing transmissions according to the requested timing configuration to sensing device 502. In an example, the series of sensing transmissions configured according to requested timing configuration is periodic. In an implementation, remote device 504-1 may transmit the series of sensing transmissions according to the requested timing configuration. According to an implementation, remote device 504-1 may be configured to halt the series of sensing transmissions when the requested timing configuration is fulfilled, or a new sensing trigger message is received.

Figure 24:
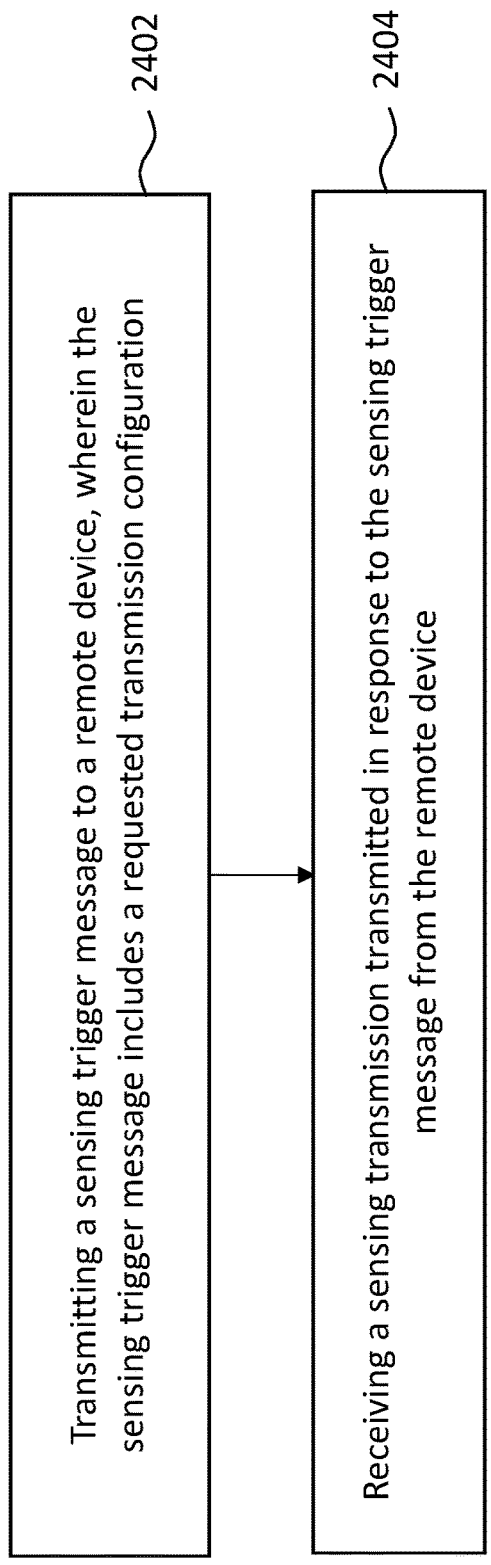
FIG. 24 depicts a flowchart for receiving a sensing transmission transmitted in response to a sensing trigger message, according to some embodiments.

FIG. 24 depicts flowchart 2400 for receiving a sensing transmission transmitted in response to a sensing trigger message, according to some embodiments.

Step 2402 includes transmitting a sensing trigger message to remote device 504-1. In an example, the sensing trigger message may include a requested transmission configuration. According to an implementation, sensing device 502 may transmit the sensing trigger message to remote device 504-1. In an example, the requested transmission configuration may indicate a steering matrix configuration. The steering matrix configuration may describe a plurality of beamforming weights to be applied to sensing transmissions by spatial mapper of remote device 504-1. In an example, the requested transmission configuration may indicate a default preconfigured steering matrix configuration. In some examples, the sensing trigger message may include an index to one or more preconfigured steering matrix configurations within the requested transmission configuration.

Step 2404 includes receiving a sensing transmission transmitted in response to the sensing trigger message from remote device 504-1. According to an implementation, sensing device 502 may receive the sensing transmission transmitted in response to the sensing trigger message from remote device 504-1.

Figure 25:
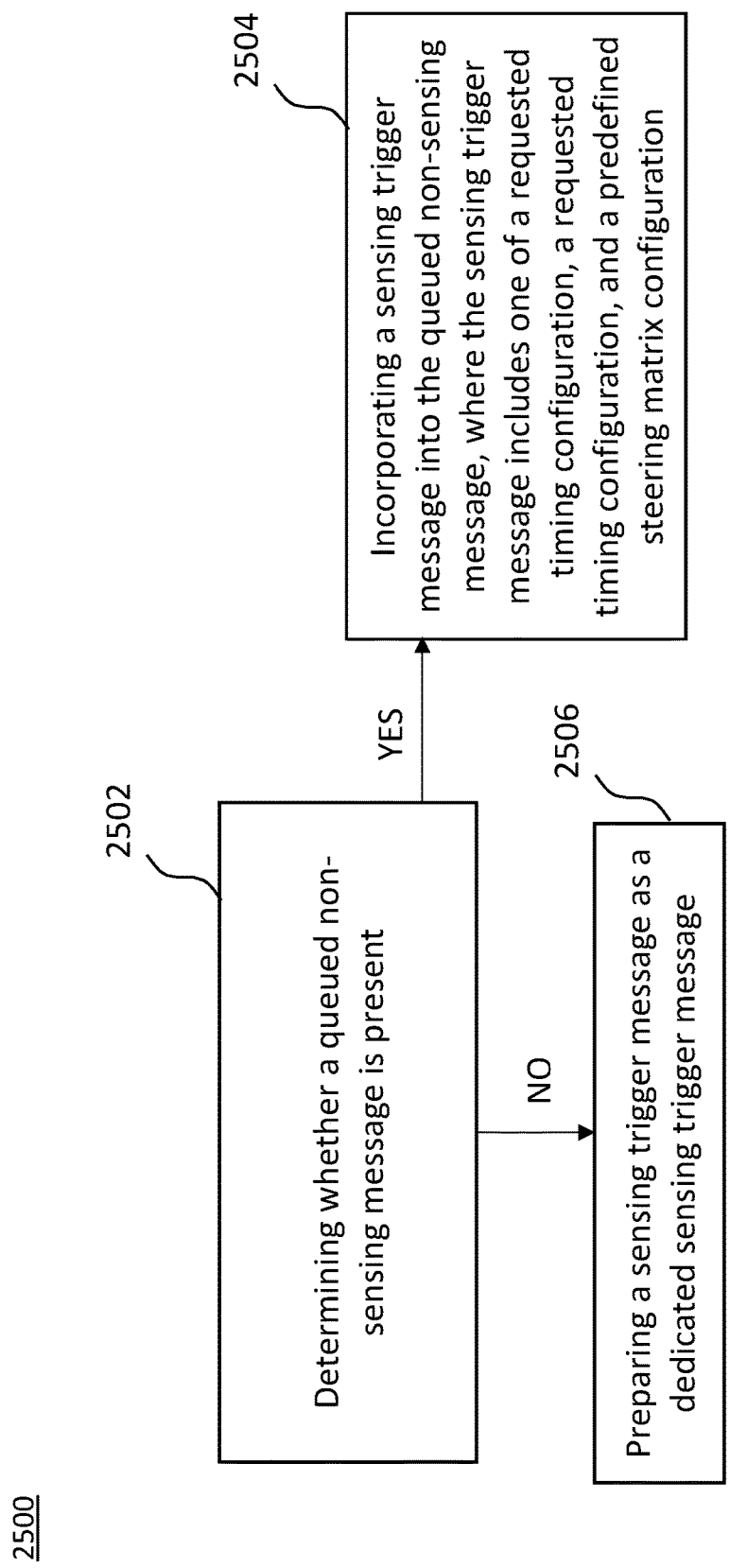
FIG. 25 depicts a flowchart for preparing a sensing trigger message as a dedicated sensing trigger message or as an aggregated message, according to some embodiments.

FIG. 25 depicts flowchart 2500 for preparing a sensing trigger message as a dedicated sensing trigger message or as an aggregated message, according to some embodiments.

Step 2502 includes determining whether a queued non-sensing message is present. According to an implementation, sensing device 502 may determine whether the queued non-sensing message is present to be transmitted to remote device 504-1. If it is determined that the queued non-sensing message is present, then flowchart 2500 proceeds to step 2204 'YES' branch, and if it is determined that the queued non-sensing message is not present, then flowchart 2500 proceeds to step 2506—'NO' branch.

Step 2504 includes incorporating a sensing trigger message into the queued non-sensing message. In an example, the sensing trigger message may include one of a requested timing configuration, a requested timing configuration, and a predefined steering matrix configuration. In an implementation, in response to determining that queued non-sensing message is present, sensing device 502 may incorporate the sensing trigger message into the queued non-sensing message using one of an A-MPDU or Multi-TID A-MPDU format. In an example, sensing device 502 may include the sensing trigger message into the queued non-sensing message as a first frame.

Step 2506 includes preparing a sensing trigger message as a dedicated sensing trigger message. In an implementation, in response to determining that queued non-sensing message is not present, sensing device 502 may prepare the sensing trigger message as the dedicated sensing trigger message.

Figure 26:
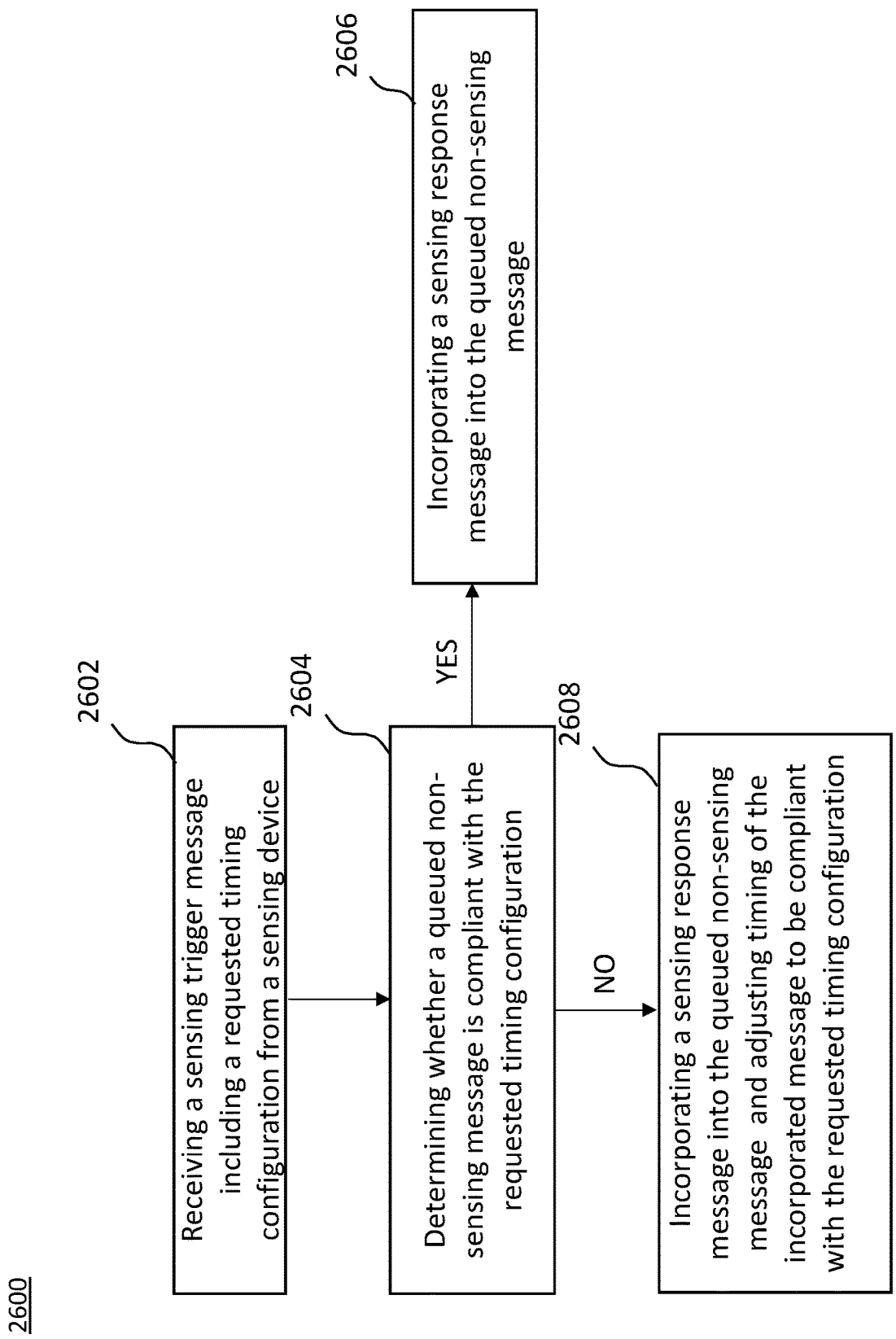
FIG. 26 depicts a flowchart for incorporating a sensing response message into a queued non-sensing message, according to some embodiments.

FIG. 26 depicts flowchart 2600 for incorporating a sensing response message into a queued non-sensing message, according to some embodiments.

Step 2602 includes receiving a sensing trigger message from sensing device 502. In an example, the sensing trigger message may include a requested timing configuration. According to an implementation, remote device 504-1 may receive the sensing trigger message from sensing device 502.

Step 2604 include determining whether a queued non-sensing message present at remote device 504-1 is compliant with the requested timing configuration. According to an implementation, remote device 504-1 may determine whether the queued non-sensing message present at remote device 504-1 is compliant with the requested timing configuration. If it is determined that the queued non-sensing message is compliant with the requested timing configuration, then flowchart 2600 proceeds to step 2606 'YES' branch, and if it is determined that the queued non-sensing message is not compliant with the requested timing configuration, then flowchart 2600 proceeds to step 2608 'NO' branch.

Step 2606 includes incorporating a sensing response message into the queued non-sensing message. According to an implementation, remote device 504-1 may incorporate the sensing response message into the queued non-sensing message in response to determining that the queued non-sensing message is compliant with the requested timing configuration.

Step 2608 includes incorporating a sensing response message into the queued non-sensing message and adjusting timing of the incorporated message to be compliant with the requested timing configuration. According to an implementations, remote device 504-1 may incorporate the sensing response message into the queued non-sensing message in response to determining that the queued non-sensing message is not compliant with the requested timing configuration and adjust timing of the incorporated message to be compliant with the requested timing configuration.

Specific embodiments include:

Embodiment 1 is a system configured for Wi-Fi sensing, where the system comprises a sensing device including at least one transmitting antenna, at least one receiving antenna, and at least one processor, wherein the at least one processor is configured to execute instructions to cause the at least one transmitting antenna to transmit a sensing configuration message and receive, via the at least one receiving antenna, a sensing configuration response message.

Embodiment 2 is the system of embodiment 1, wherein the sensing configuration message includes a configuration query indication and the sensing configuration response message includes a transmission capability indication associated with a remote device.

Embodiment 3 is the system of embodiment 1 or embodiment 2, wherein the sensing configuration message includes no data elements.

Embodiment 4 is the system of embodiment 1 or embodiment 2, wherein the sensing configuration message further includes data elements.

Embodiment 5 is the system of any of embodiment 1 to embodiment 4, wherein the sensing configuration message includes a requested transmission configuration corresponding to requirements of a sensing transmission and the sensing configuration response message includes a delivered transmission configuration corresponding to a transmission capability associated with a remote device.

Embodiment 6 is the system of any of embodiment 1 to embodiment 5, wherein the transmitted sensing configuration message includes a steering matrix configuration and the sensing configuration response message includes a steering matrix configuration acknowledgement associated with a remote device.

Embodiment 7 is a system configured for Wi-Fi sensing, where the system comprises a remote device including at least one transmitting antenna, at least one receiving antenna, and at least one processor, wherein the at least one processor is configured to execute instructions to receive a sensing configuration message including a requested transmission configuration, determine that a transmission capability associated with the remote device corresponds to the requested transmission configuration, and send a sensing configuration response message including a delivered transmission configuration.

Embodiment 8 is the system of embodiment 7, wherein the remote device is further configured to transmit one or more sensing transmissions according to the requested transmission configuration responsive to a sensing trigger message that includes no new requested transmission configuration.

Embodiment 9 is a system comprising a sensing device including at least one transmitting antenna, at least one receiving antenna, and at least one processor, wherein the at least one processor is configured to execute instructions to cause the at least one transmitting antenna to transmit a sensing trigger message, and receive, via the at least one receiving antenna, a sensing transmission transmitted in response to the sensing trigger message.

Embodiment 10 is the system of embodiment 9, wherein the sensing trigger message includes a requested transmission configuration not exceeding a transmission capability of a remote device.

Embodiment 11 is the system of embodiment 9 or embodiment 10, wherein the sensing trigger message includes a requested timing configuration for the sensing transmission and wherein the sensing transmission is transmitted in response to the sensing trigger message and according to the requested timing configuration.

Embodiment 12 is the system of embodiment 11, wherein the requested timing configuration is indicative of timing requirements for a measurement campaign including a series of sensing transmissions from a remote device to the sensing device.

Embodiment 13 is the system of any of embodiment 9 to embodiment 12, wherein the at least one processor is further configured to execute instructions to receive the sensing transmission from a remote device in response to the sensing trigger message, and perform a sensing measurement on the sensing transmission Embodiment 14 is the system of embodiment 13, wherein the sensing measurement is performed on a training field of the sensing transmission.

Embodiment 15 is the system of any of embodiment 9 to embodiment 14, wherein the sensing transmission comprises one of a sensing response NDP or a sensing response message.

Embodiment 16 is the system of any of embodiment 9 to embodiment 15, wherein the sensing transmission includes a delivered transmission configuration.

Embodiment 17 is the system of any of embodiment 9 to embodiment 16, wherein prior to the sensing device receiving the sensing transmission, the sensing device receives a sensing response announcement.

Embodiment 18 is the system of embodiment 17, wherein the sensing response announcement comprises a delivered transmission configuration.

Embodiment 19 is the system of any of embodiment 10 to embodiment 17, wherein the sensing device is further configured to receive a sensing response message from the remote device when the requested transmission configuration supports data transfer, and receive a sensing response announcement from the remote device when the requested transmission configuration does not support data transfer.

Embodiment 20 is the system of any of embodiment 9 to embodiment 19, wherein the sensing trigger message includes a steering matrix configuration within the requested transmission configuration.

Embodiment 21 is the system of any of embodiment 9 to embodiment 20, wherein the sensing trigger message includes an index to one or more preconfigured steering matrix configurations within the requested transmission configuration.

Embodiment 22 is the system of any of embodiment 9 to embodiment 21, wherein the at least one processor is further configured to execute instructions to determine whether a queued non-sensing message is present at the sensing device, responsive to determining that a queued non-sensing response message is present, incorporate the sensing trigger message into the queued non-sensing message as an incorporated message, and responsive to determining that no queued non-sensing response message is present, prepare the sensing trigger message as dedicated sensing trigger message.

Embodiment 23 is the system of any of embodiment 9 to embodiment 22, wherein the sensing trigger message is incorporated with the queued non-sensing message using Aggregated MPDU.

Embodiment 24 is the system of any of embodiment 9 to embodiment 22, wherein the sensing trigger message is incorporated with the queued non-sensing message using Multi Traffic ID Aggregated MPDU.

Embodiment 25 is the system of embodiment 23 or embodiment 24, wherein the sensing trigger message is included as a first frame in the incorporated message.

Embodiment 26 is the system of any of embodiment 9 to embodiment 25, wherein the sensing trigger message further includes a requested timing configuration.

Embodiment 27 is the system of any of embodiment 20 to embodiment 26, wherein the steering matrix configuration describes a plurality of beamforming weights to be applied to sensing transmissions by a spatial mapper of a remote device.

Embodiment 28 is the system of any of embodiment 20 to embodiment 27, wherein the one or more preconfigured steering matrix configurations each describe a plurality of beamforming weights to be applied to sensing transmissions by a spatial mapper of a remote device.

Embodiment 29 is the system of any of embodiment 10 to embodiment 28, wherein the sensing trigger message includes a selection of the one or more preconfigured steering matrix configurations as part of the requested transmission configuration.

Embodiment 30 is the system of any of embodiment 9 to embodiment 29, wherein the at least one processor is further configured to execute instructions to identify a delivered transmission configuration of the sensing transmission, and compute a sensing measurement according to the delivered transmission configuration and the sensing transmission.

Embodiment 30 is the system of any of embodiment 9 to embodiment 30, wherein the processor is further configured to execute instructions to determine that the sensing transmission does not include a delivered transmission configuration, identify a default transmission configuration responsive to the determination, and compute a sensing measurement according to the default transmission configuration and the sensing transmission.

Embodiment 32 is a system comprising a sensing device including at least one transmitting antenna, at least one receiving antenna, and at least one processor, wherein the at least one processor is configured to execute instructions to cause the at least one transmitting antenna to transmit a sensing trigger message, and receive, via the at least one receiving antenna, a sensing response announcement transmitted in response to the sensing trigger message, wherein the sensing response announcement includes a delivered transmission configuration and the processor is further configured to execute instructions to receive a sensing response NDP following the sensing response announcement.

Embodiment 33 is a system comprising a remote device including at least one transmitting antenna, at least one receiving antenna, and at least one processor, wherein the at least one processor is configured to execute instructions to cause the at least one receiving antenna to receive a sensing trigger message, and responsive to receiving the sensing trigger message, transmit, via the at least one transmitting antenna, a sensing response message.

Embodiment 34 is the system of embodiment 33, wherein responsive to receiving the sensing trigger message, the remote device determines whether a queued non-sensing message is present, responsive to determining that a queued non-sensing response message is present, the remote device incorporates the sensing response message into the queued non-sensing message, and responsive to determining that a queued non-sensing response message is not present, the remote device prepares the sensing response message as a dedicated transmission.

Embodiment 35 is the system of embodiment 33 or embodiment 34, wherein the sensing trigger message further comprises a requested transmission configuration, responsive to receiving the sensing trigger message comprising the requested transmission configuration, a delivered transmission configuration is included in the sensing response message, and prior to transmitting the sensing response message, remote device transmission parameters corresponding to the delivered transmission configuration are applied to the remote device.

Embodiment 36 is the system of any of embodiment 33 to embodiment 35, wherein the sensing trigger message further includes a requested timing configuration, responsive to the requested timing configuration, the remote device determines whether a queued non-sensing message present at the remote device is compliant with the requested timing configuration, responsive to determining that a queued non-sensing message is present and compliant the remote device incorporates the sensing response message into the queued non-sensing message, and the remote device sends the incorporated message.

Embodiment 37 is the system of any of embodiment 33 to embodiment 36, wherein the sensing trigger message further includes a requested timing configuration, responsive to the requested timing configuration, the remote device determines whether a queued non-sensing message present at the remote device is compliant with the requested timing configuration, responsive to determining that a queued non-sensing message is not is compliant with the requested timing configuration the remote device incorporates the sensing response message into the queued non-sensing message, and the remote device adjusts timing of the incorporated message to be compliant with the requested timing configuration, and the remote device sends the incorporated message.

Embodiment 38 is a system comprising a remote device including at least one transmitting antenna, at least one receiving antenna, and at least one processor, wherein the at least one processor is configured to execute instructions to cause the at least one receiving antenna to receive a sensing trigger message, responsive to receiving the sensing trigger message, transmit, via the at least one transmitting antenna, a sensing response announcement, and transmit, via the at least one transmitting antenna, a sensing response NDP.

Embodiment 39 is the system of embodiment 38, wherein the sensing trigger message further comprises a requested transmission configuration, responsive to receiving the sensing trigger message comprising the requested transmission configuration, a delivered transmission configuration is included in the sensing response announcement, and remote device transmission parameters corresponding to the delivered transmission configuration are applied to the remote device prior to transmitting the sensing response NDP.

Embodiment 40 is the system of any of embodiment 33 to embodiment 39, wherein the at least one processor is further configured to execute instructions to transmit a series of sensing transmissions according to a requested timing configuration.

Embodiment 41 is the system of embodiment 40, wherein the series of sensing transmissions configured according to the requested timing configuration is periodic.

Embodiment 42 is the system of embodiment 40 or embodiment 41, wherein the at least one processor is further configured to execute instructions to halt the series of sensing transmissions when the requested timing configuration is fulfilled or a new sensing trigger message is received.

Embodiment 43 is the system of any of embodiment 39 to embodiment 42, wherein the requested transmission configuration indicates a default preconfigured steering matrix configuration.

Embodiment 44 is the system of any of embodiment 38 to embodiment 43, wherein responsive to receiving the sensing trigger message, the remote device determines whether a queued non-sensing message is present, responsive to determining that the queued non-sensing response message is present, the remote device incorporates the sensing response announcement into the queued non-sensing message, and responsive to determining that the queued non-sensing response message is not present, the remote device prepares the sensing response announcement as a dedicated transmission.

Embodiment 45 is the system of any of embodiment 34 to embodiment 37 or embodiment 44, wherein the sensing response message or sensing response announcement is incorporated as an incorporated message with the queued non-sensing message using Aggregated MPDU.

Embodiment 46 is the system of any of embodiment 34 to embodiment 37 or embodiment 44, wherein the sensing response message or sensing response announcement is incorporated as an incorporated message with the queued non-sensing message using Multi Traffic ID Aggregated MPDU.

Embodiment 47 is the system of any of embodiment 34 to embodiment 37 or embodiment 44 to embodiment 46, wherein the sensing response announcement is included as a first frame in the incorporated message.

Embodiment 48 is the system of any of embodiment 34 to embodiment 37 or embodiment 44 to embodiment 46, wherein the sensing transmission is transmitted according to a received timing configuration.

Embodiment 49 is the system of any of embodiment 38 to embodiment 48, wherein the sensing trigger message further includes a requested transmission configuration responsive to the requested transmission configuration, the remote device determines whether a queued non-sensing message present at the remote device is compliant with the requested transmission configuration, responsive to determining that a queued non-sensing message is not compliant with the requested transmission configuration, the remote device incorporates the sensing response announcement into the queued non-sensing message as an incorporated message, and the remote device sends the incorporated message.

Embodiment 50 is the system of any of embodiment 38 to embodiment 49, wherein the sensing response NDP is transmitted according to the requested transmission configuration.

Each of the above described embodiments 1 through 50 of systems may further be implemented as methods carried out by appropriate systems and devices as described herein.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system configured for Wi-Fi sensing, the system comprising:
a sensing initiator including at least one transmitting antenna, at least one receiving antenna, and
at least one processor, wherein the at least one processor is configured to execute instructions to:
cause the at least one transmitting antenna to transmit a sensing trigger message including a requested transmission configuration including requested transmission parameters for a sensing transmission configured for making a motion sensing measurement on a sensing space;
receive, via the at least one receiving antenna, the sensing transmission from a sensing responder, the sensing transmission being in accordance with the requested transmission configuration; and
generate a sensing measurement indicative of presence or motion in the sensing space based on the sensing transmission transmitted in accordance with the requested transmission configuration.

2. The system of claim 1, wherein the sensing trigger message includes a configuration query indication and the sensing transmission includes a delivered transmission configuration corresponding to the sensing transmission.

3. The system of claim 1, wherein the sensing transmission includes no data elements and includes a training field used to make a sensing measurement.

4. The system of claim 1, wherein the sensing transmission further includes data elements and a training field used to make a sensing measurement.

5. The system of claim 1, wherein
the sensing transmission is associated with a sensing responder and includes a delivered transmission configuration corresponding to a configuration of the sensing transmission transmitted by the sensing responder, and
the delivered transmission configuration equals the requested transmission configuration.

6. The system of claim 1, wherein the sensing trigger message includes a steering matrix configuration for configuring one or more antenna elements of a sensing responder and the sensing transmission received from the sensing responder is in accordance with the steering matrix configuration.

7. The system of claim 1,
wherein the requested transmission configuration includes requested parameters for the sensing transmission.

8. The system of claim 1, wherein the requested transmission configuration includes requested parameters for a sensing measurement instance.

9. The system of claim 1, wherein the sensing trigger message is configured to trigger the sensing transmission from a sensing responder.

10. The system of claim 1, wherein the at least one processor is further configured to receive, via the at least one receiving antenna, a sensing response announcement prior to receiving the sensing transmission.

11. A system configured for Wi-Fi sensing, the system comprising:
a sensing responder including at least one transmitting antenna, at least one receiving antenna, and at least one processor, wherein the at least one processor is configured to execute instructions to:
receive a sensing trigger message including a requested transmission configuration including requested transmission parameters for a sensing transmission configured for making a motion sensing measurement on a sensing space;
determine that a transmission capability associated with the sensing responder corresponds to the requested transmission configuration; and
send the sensing transmission, the sensing transmission being in accordance with the requested transmission configuration and being configured to permit generation of a sensing measurement indicative of presence or motion in the sensing space.

12. The system of claim 11, wherein the sensing responder is further configured to transmit additional sensing transmissions according to the requested transmission configuration responsive to the sensing trigger message.

13. The system of claim 11, wherein
the sensing trigger message is carried in a first action management frame sent to the sensing responder by a sensing initiator, and
the sensing transmission is carried in a second action management frame sent to the sensing initiator by the sensing responder.

14. The system of claim 11,
wherein the requested transmission configuration includes requested parameters for the sensing transmission.

15. The system of claim 11, wherein the requested transmission configuration includes a steering matrix configuration for configuring the at least one transmitting antenna.

16. The system of claim 11, further configured to transmit the sensing transmission responsive to the sensing trigger message.

17. The system of claim 11, wherein the at least one processor is further configured to send, via the at least one transmitting antenna, a sensing response announcement prior to sending the sensing transmission.

18. A method for Wi-Fi sensing, the method comprising:
transmitting, via at least one transmitting antenna of a sensing initiator, a sensing trigger message including a requested transmission configuration including requested transmission parameters for a sensing transmission configured for making a motion sensing measurement on a sensing space;
receiving, via at least one receiving antenna of the sensing initiator, the sensing transmission from a sensing responder, the sensing transmission being in accordance with the requested transmission configuration; and
generating a sensing measurement indicative of presence or motion in the sensing space based on the sensing transmission transmitted in accordance with the requested transmission configuration.

19. The method of claim 18, wherein the sensing trigger message includes a configuration query indication and the sensing transmission includes a delivered transmission configuration corresponding to the sensing transmission.

20. The method of claim 18, wherein the sensing transmission includes no data elements and includes a training field used to make a sensing measurement.

21. The method of claim 18, wherein the sensing transmission further includes data elements and a training field used to make a sensing measurement.

22. The method of claim 18, wherein
the sensing transmission is associated with a sensing responder and includes a delivered transmission configuration corresponding to a configuration of the sensing transmission transmitted by the sensing responder, and the delivered transmission configuration equals the requested transmission configuration.

23. The method of claim 18, wherein the sensing trigger message includes a steering matrix configuration for configuring one or more antenna elements of a sensing responder and the sensing transmission received from the sensing responder is in accordance with the steering matrix configuration.

24. The method of claim 18,
wherein the requested transmission configuration includes requested parameters for the sensing transmission.

25. The method of claim 18, wherein the requested transmission configuration includes requested parameters for a sensing measurement instance.

26. The method of claim 18, wherein the sensing trigger message is configured to trigger the sensing transmission from a sensing responder.

27. The method of claim 18, further comprising receiving, via the at least one receiving antenna, a sensing response announcement prior to receiving the sensing transmission.

28. A method configured for Wi-Fi sensing, the method comprising:
receiving, via at least one receiving antenna of a sensing responder, a sensing trigger message including a requested transmission configuration including requested transmission parameters for a sensing transmission configured for making a motion sensing measurement on a sensing space;
determining, by at least one processor of the sensing responder, that a transmission capability associated with the sensing responder corresponds to the requested transmission configuration; and
sending, via at least one transmitting antenna of the sensing responder, the sensing transmission, the sensing transmission being in accordance with the requested transmission configuration and being configured to permit generation of a sensing measurement indicative of presence or motion in a sensing space.

29. The method of claim 28, further comprising:
transmitting, by the at least one transmitting antenna, additional sensing transmissions according to the requested transmission configuration responsive to the sensing trigger message.

30. The method of claim 28, wherein
the sensing trigger message is carried in a first action management frame sent to the sensing responder by a sensing initiator, and
the sensing transmission is carried in a second action management frame sent to the sensing initiator.

31. The method of claim 28,
wherein the requested transmission configuration includes a steering matrix configuration for configuring the at least one transmitting antenna.

32. The method of claim 28, wherein the requested transmission configuration includes requested parameters for a sensing measurement instance.

33. The method of claim 28, wherein the sensing transmission is transmitted responsive to the sensing trigger message.

34. The method of claim 28, further comprising transmitting, via the at least one transmitting antenna, a sensing response announcement prior to sending the sensing transmission.

* * * * *